(12) United States Patent
Wilson et al.

(10) Patent No.: US 8,224,891 B2
(45) Date of Patent: Jul. 17, 2012

(54) ELECTRONIC GAME-BASED LEARNING SYSTEM

(75) Inventors: Scott N. Wilson, Norman, OK (US); Mary J. O'Hair, Norman, OK (US); Jean L. Cate, Norman, OK (US); Leslie A. Williams, Oklahoma City, OK (US); Linda K. Atkinson, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 332 days.

(21) Appl. No.: 12/137,961

(22) Filed: Jun. 12, 2008

(65) Prior Publication Data

US 2010/0233667 A1    Sep. 16, 2010

(51) Int. Cl.
    *G06F 15/16*    (2006.01)
(52) U.S. Cl. ............. 709/203; 709/229; 709/250; 463/1
(58) Field of Classification Search .................. 709/203, 709/229, 250, 217; 463/1, 42, 43
See application file for complete search history.

(56) References Cited

U.S. PATENT DOCUMENTS

| | | | |
|---|---|---|---|
| 2002/0022507 A1* | 2/2002 | Dan et al. ................. | 463/42 |
| 2002/0107072 A1* | 8/2002 | Giobbi .................... | 463/42 |
| 2002/0165630 A1* | 11/2002 | Arthur et al. ............. | 700/91 |
| 2003/0204566 A1* | 10/2003 | Dhupelia et al. ......... | 709/205 |
| 2007/0021213 A1* | 1/2007 | Foe et al. ................. | 463/42 |
| 2008/0004094 A1* | 1/2008 | Mueller et al. ........... | 463/1 |
| 2008/0113614 A1* | 5/2008 | Rosenblatt ............... | 455/3.05 |
| 2008/0119286 A1* | 5/2008 | Brunstetter et al. ....... | 463/43 |
| 2008/0200256 A1* | 8/2008 | Gagner et al. ............ | 463/42 |
| 2008/0286740 A1* | 11/2008 | Wi et al. .................. | 463/42 |
| 2009/0069084 A1* | 3/2009 | Reece et al. ............. | 463/32 |
| 2009/0149246 A1* | 6/2009 | Opaluch .................. | 463/29 |

* cited by examiner

*Primary Examiner* — Philip B Tran
(74) *Attorney, Agent, or Firm* — Dunlap Codding, P.C.

(57) ABSTRACT

An electronic game-based learning system capable of providing a game-based learning environment(s) to at least one user is described. The system having at least one host system capable of selectively providing video and output portions of a game-based learning environment(s) and at least one client system capable of selectively providing input portions to the host system such that the client system provides the user within an interactive game-based learning environment(s).

9 Claims, 14 Drawing Sheets

ELECTRONIC GAME-BASED LEARNING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

BACKGROUND OF THE INVENTION

1. Field of the Invention

The present invention relates generally to an electronic game-based learning system. More specifically, but not by way of limitation, the present invention relates to a multi-player online learning system.

2. Discussion of Related Art

The technological revolution over the past two decades has broadened the arena for current teaching strategies. In many situations, however, students today still encounter the same outdated instructional strategies that their parents and grandparents experienced.

According to a study conducted by the Kaiser Family Foundation in 2005, children, ages 8 to 18, spend more time (44.5 hours per week) in front of computer, television, and game screens than any other activity in their lives except sleeping. As such, the development of a virtual environment(s) for learning is gaining momentum within the learning community.

Virtual reality systems are providing students with a learning experience "hidden" within a video game façade. For example, Harvard University, with funding from the National Science Foundation, has developed an interactive computer simulation system to provide scientific inquiry and $21^{st}$ century skills. The computer simulation system feels like a videogame to the student, but contains content developed from the National Science Education Standards, National Educational Technology Standards, and the $21^{st}$ Century Skills. In River City, students virtually travel back in time and use $21^{st}$ century skills and technology to address $19^{th}$ century problems. Students work in small research teams and use technology to form and test hypotheses, develop controlled experiments to test the hypothesis, and make recommendations all in an online environment(s).

There are several drawbacks in River City. For example, the instructor has little or no direct interaction with students within the game environment. Students are asked to provide answers to content based questions. As such, instructor interaction is rarely needed if at all. Additionally, River City does not provide for tool sets within the environment. For example, students do not have access to spreadsheets, word processing, and/or other similar applications within the River City environment.

BRIEF SUMMARY OF EMBODIMENTS

The present embodiments relate to an electronic game-based learning system. The electronic game-based learning system is capable of providing a game-based learning environment(s) to one user and preferably many users. Generally, the electronic game-based system includes at least one host system capable of selectively providing video and output portions of one or more game-based learning environment(s), and one or more client system(s) capable of receiving the video and output portions and providing input portions to the host system to interactively communicate with the one or more game-based learning environment(s). Additionally, the system generally includes at least one administrator system for receiving and presenting information to an administrator for selectively evaluating in real-time the video, input portions, and output portions of the host system and one or more client system(s).

In another embodiment, a method for developing a game scenario for use within a game-based learning environment(s) is described. The method includes the step of assembling a team comprising at least one subject matter expert, at least one pedagogy practitioner, and at least one instructional designer to develop a game scenario. The game scenario includes learning standards based on national standards, state standards, or other similar learning standards. Additionally, a formative game evaluation document of the game scenario is provided for review by technical experts, potential users, and a content and evaluation committee. The game scenario is implemented within a virtual environment(s) and tested. Once the game scenario is deemed acceptable, the game scenario may be included within a game-based learning environment(s).

BRIEF DESCRIPTION OF THE SEVERAL VIEWS OF THE DRAWINGS

So that the above referenced features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of the invention, and are therefore not to be considered limiting of its scope, for the invention may admit to other equally effective embodiments.

DETAILED DESCRIPTION OF EXEMPLARY EMBODIMENTS

1. Hardware System Overview

Figure 1:
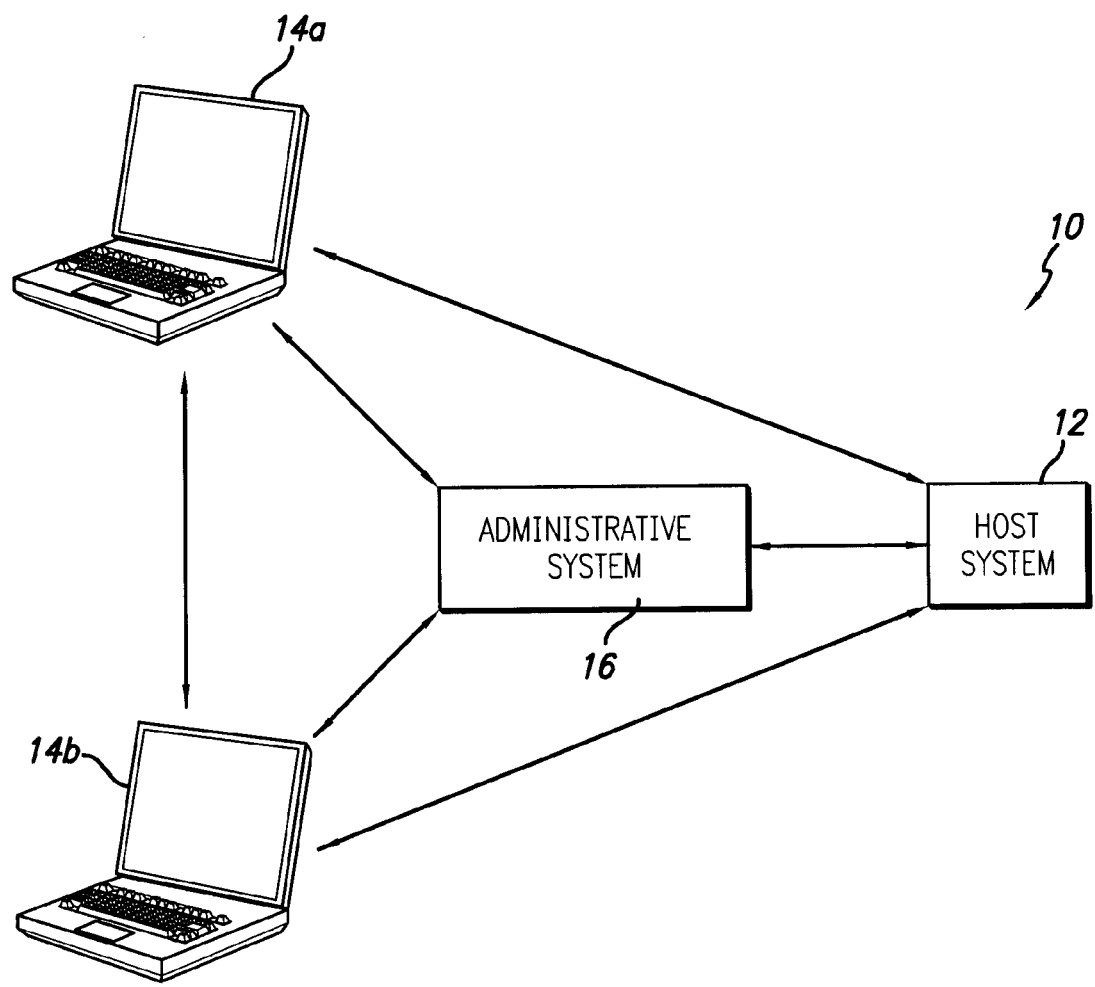
FIG. 1 is a block diagram of an exemplary embodiment of an electronic game-based learning system for providing a game-based learning environment(s) constructed in accordance with the present invention.

Referring now to the figures, and more particularly to FIG. 1, an electronic game-based learning system 10 is shown constructed in accordance with the present invention. The system 10 is preferably adapted to provide an interactive learning environment(s) for one or more users. Generally, each user is provided and guided through a series of scenarios in or more game-based learning environment(s) that allow the user to interact within a virtual world. Such scenarios may be based on national learning standards, state learning standards, and/or any other learning standards capable of providing the appropriate skill or skill set to the user.

Referring to FIG. 1, shown therein is a block diagram of an exemplary electronic game-based learning system 10 suitable for implementing embodiments of the present invention. The system 10 includes at least one host system 12 communicating with one or more client systems 14 via a network to provide the game-based learning environment(s) to at least one user. For purposes of clarity, only two client systems 14a and 14b and one host system 12 are discussed herein. It should be understood that the present invention contemplates that any number of host systems 12 and/or client systems 14 may be included in the system 10 in accordance with the present invention.

The system 10 is designed to provide flexibility in its deployment. Depending upon the requirements of the particular embodiment, the system 10 may be designed to work in almost any environment(s) such as a desktop application, a Web based application, a series of Web based applications communicating with an external application, and/or the like. For example, a portion of the data may be stored on the client systems 14a and 14b and/or the host system 12, with storage and computation performed in whole or in part at both the client systems 14a and 14b and the host system 12. Alternatively, storage and computation of data may be performed in whole or in part at either the client systems 14a and 14b or the host system 12. Additionally, storage and computation may be provided by a third party application system with the client systems 14a and 14b and the host system 12 providing the initial application execution.

In general, each of the client systems 14a and 14b is a computer system associated with a user or group of users. For example, client system 14a may be associated with a particular student or a particular group of students. Preferably, the user is a student within math, English (reading), science, and social studies classrooms.

In one embodiment, the client systems 14a and 14b are one or more computing systems able to embody and/or execute the logic of the processes described herein. The logic embodied in the form of software instructions or firmware may be executed on any appropriate hardware. Such hardware may include a dedicated system or systems, a general-purpose computer system, a distributed processing system, and/or the like. For example, the client systems 14a and 14b can be implemented as one or more database servers, personal computers, minicomputers, personal digital assistants, cellular telephones, and/or the like. In the preferred embodiment, the client systems 14a and 14b are ultra mobile personal computers (UMPC). As these systems are well understood and known within the art, a detailed description of how to make or use such computer systems is not deemed necessary herein.

The client systems 14a and 14b are capable of receiving and providing data signals to and from the host system 12. In the preferred embodiment, the client systems 14a and 14b are capable of receiving from the host system 12 video and output relating to the one or more game-based learning environment(s) and providing input to the host system 12. The input to the host system 12 allows the client systems 14a and 14b to interactively participate in the game-based learning environment(s).

Additionally, each client system 14a and 14b is capable of communicating with other client systems. For example, in FIG. 1, client system 14a is in communication with the host system 12 and in communication with client system 14b. Alternatively, the client system 14a may be capable of transmitting data to the host system 12, and the data can then be transmitted by the host system 12 to the client system 14b. Allowing communication between client systems 14a and 14b provides a mechanism for each user to interactively participate in the game-based learning environment(s) with other users.

In one embodiment, the learning system 12 further includes at least one administrator system 16. Although only one administrator system 16 is illustrated in FIG. 1, it should be understood that multiple administrator systems 16 may be used in accordance with the present invention. Further, the administrator system 16 may be provided separately or as a portion of the host system 12.

In general, the administrator system 16 is a computer system associated with an administrative entity. For example, the administrator system 16 may be associated with a teacher and/or instructor. The administrator system 16 is in communication with the one or more client systems 14 and the host system 12. Generally, the administrator system 16 is capable of managing each client system 14a and 14b. By allowing the administrator system 16 access to the client systems 14, a teacher and/or instructor is able to provide real-time evaluation and interaction of a student in the game-based learning environment(s).

The host system 12 is any suitable device(s) capable of providing at least a portion of the game-based learning environment(s) to the client systems 14a and 14b and/or the administrator system 16. In one embodiment, the host system 12 is comprised of one or more computer systems that are capable of receiving, storing, and transmitting data to and from the client systems 14a and 14b and/or administrator system 16 over a network. The configuration of the computer systems will depend greatly upon the requirements and needs of the particular embodiment of the system 10. In the preferred embodiment, the host system 12 includes database servers, log in servers, and application/web servers. For example, the host system 12 may be established as a website capable of communicating with a variety of systems utilizing the Internet. However, it should be understood that the host system 12 can be implemented in other manners so long as the client systems 14*a* and 14*b* and/or the administrative system 16 can communicate with the host system 12.

Storage and computation during the game-based environment(s) may be within the client system 14 and/or the host system 12. In the preferred embodiment, the client system 14 and the host system 12 cooperatively provide storage and computation.

As illustrated in FIG. 1, data communicated to the client systems 14*a* and 14*b*, and the administrative system 16, are shown separately for purposes of clarity. It should be apparent to one skilled in the art that the host system 12 may communicate with the client systems 14*a* and 14*b* via a single data link, or multiple datalinks depending on the design considerations of the system. It should also be understood that although the client systems 14*a* and 14*b*, and the administrative system 16, are positioned remotely from the host system 12 in FIG. 1, the client systems 14*a* and 14*b* and/or the administrative system 16 may be integrated into the host system 12 depending on design considerations.

2. Overview of Function of Electronic Game-Based Learning Systems

Figure 2A:
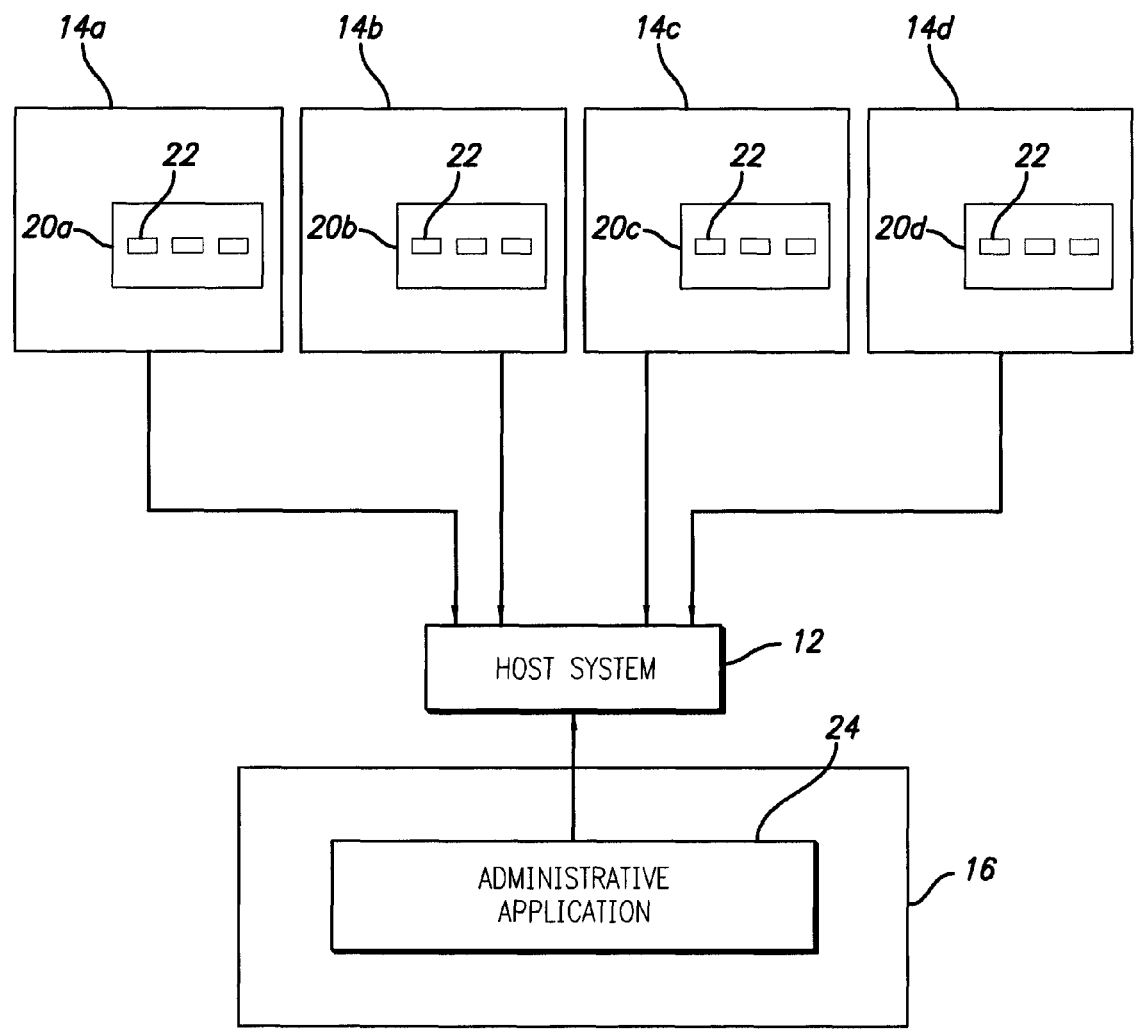
FIG. 2A is a block diagram of another exemplary embodiment of an electronic game-based learning system for providing a game-based learning environment(s), constructed in accordance with the present invention.

As illustrated in FIG. 2A, the electronic game-based learning system 10 includes at least one client application 20. The client application 20 is generally an application program that provides one or more electronic game-based learning environment(s) to the user. The client applications 20*a*-20*d* may be run in whole or in part on the client systems 14*a*-*d* and/or the host system 12. For purposes of clarity, each client application 20*a*-*d* is illustrated in FIG. 2 on separate client systems 14*a*-*d* respectively. It should be noted that portions of the client application 20 may also be provided by a third party system (not shown). For example, verification of user authentication may be provided by a third party system.

The client application 20, or portions of the client application 20, may be run on the client system 14 and/or host system 12. For example, the client applications 20*a*-20*d* may be provided as software downloaded to each client system 14*a*-14*d* respectively. The software may facilitate a connection via the Internet to the host system 12. Alternatively, the host system 12 may provide the client application 20 to the client system 14. For example, the client system 14 may connect with the host system 12 through a direct connection, wireless connection, a public network such as the Internet, or a private network or combinations thereof. The host system 12 may then allow the client system 14 to access the client application 20 stored on the host system 12.

In one embodiment, the host system 12 integrates each client application 20*a*-*d* to provide for massive multiplayer online game (MMOG) environment(s). Alternatively, the host system 12 may provide for separate game environments for each client application 20*a*-*d* without integration where the client applications 20*a*-*d* are either the same or different game environments.

It is contemplated that the client system 14 may be provided full and/or partial functionality of the client application 20 when disconnected from the host system 12. For example, if a student is unable to connect to the host system 12, the client application 20 will provide options that may allow the user to work through tasks. This may allow the student to work in the game-based environment(s) within the home and/or school settings.

As previously described, the client application 20 is generally an application program that provides one or more game-based learning environment(s) to the user. The client application 20 includes several in-game applications 22. For example, in-game applications 22 may include journals, report generators, spreadsheets, e-mail systems, chat capabilities and/or the like. In-game applications 22 allow for the user to organize and reflect on data collected within the virtual environment(s) without interruption. For example, data collected by the user within the game-based learning environment(s) can immediately be placed within an in-game spreadsheet application without leaving the game-based learning environment(s).

Additionally, in-game applications 22 may provide a mechanism for facilitating team-based activities and encouraging communication between users. For example, each student may be placed on a five-student team for completing game-based tasks. Interaction with other teammates may be direct or through chat capabilities included within the game-based environment(s). Due to the environment and variety of skill between users in a team-based activities, each user may provide guidance to other users within the system 10. For example, a student who may be behind in math, may provide invaluable assistance in other areas, while another student, who is a member of the team, may provide a strong math foundation.

The electronic game-based learning system 10 also may include an administrator application 24. The administrator application 24, or portions of the administrator application 24, may be run on the administrator system 16 and/or host system 12. The administrator application 24 includes all of the resources within the client application 20 in addition to administrator functions. Administrator functions may, for example, allow the administrator to be able to oversee one or more client application 20. In this regard, the administrator, such as a teacher and/or instructor, using the administrator application 24 is able to retrieve charts, journal entries, spreadsheet, and technical reports from the client application in real-time. Additionally, the administrator application 24 permits the administrator to view the client application to review the progression of the user through the client application in real-time. This may allow the administrator to serve as a mentor if the user operating the client application 20 encounters an activity above the user's understanding and/or capabilities.

In one exemplary embodiment, the host system 12 includes a method of registering and authenticating users of the client application 20 and/or administrator application 24. Registration may be provided through a series of fields such as Name, Address, Age, School Name, Grade Level, and the like. Registering users allows for the creation of a database in which demographics may be analyzed for further research or in the creation or alteration of the game-based learning environment(s).

Authentication of the user may be through a password (such as a PIN), or any other suitable method within the art. In the preferred embodiment, authentication or verification of a user is through a username and password generated by the host system 12. It should be noted that although the host system 12 is described as authenticating the users, authentication may alternatively be performed on the client system 14 and/or the administrator system 16. Additionally, it is contemplated that multiple authentications on a combination of systems, e.g. the client system 14 and the host system 12, may further increase security of the application. Further, a third party application may be used for authentication.

Figure 2B:
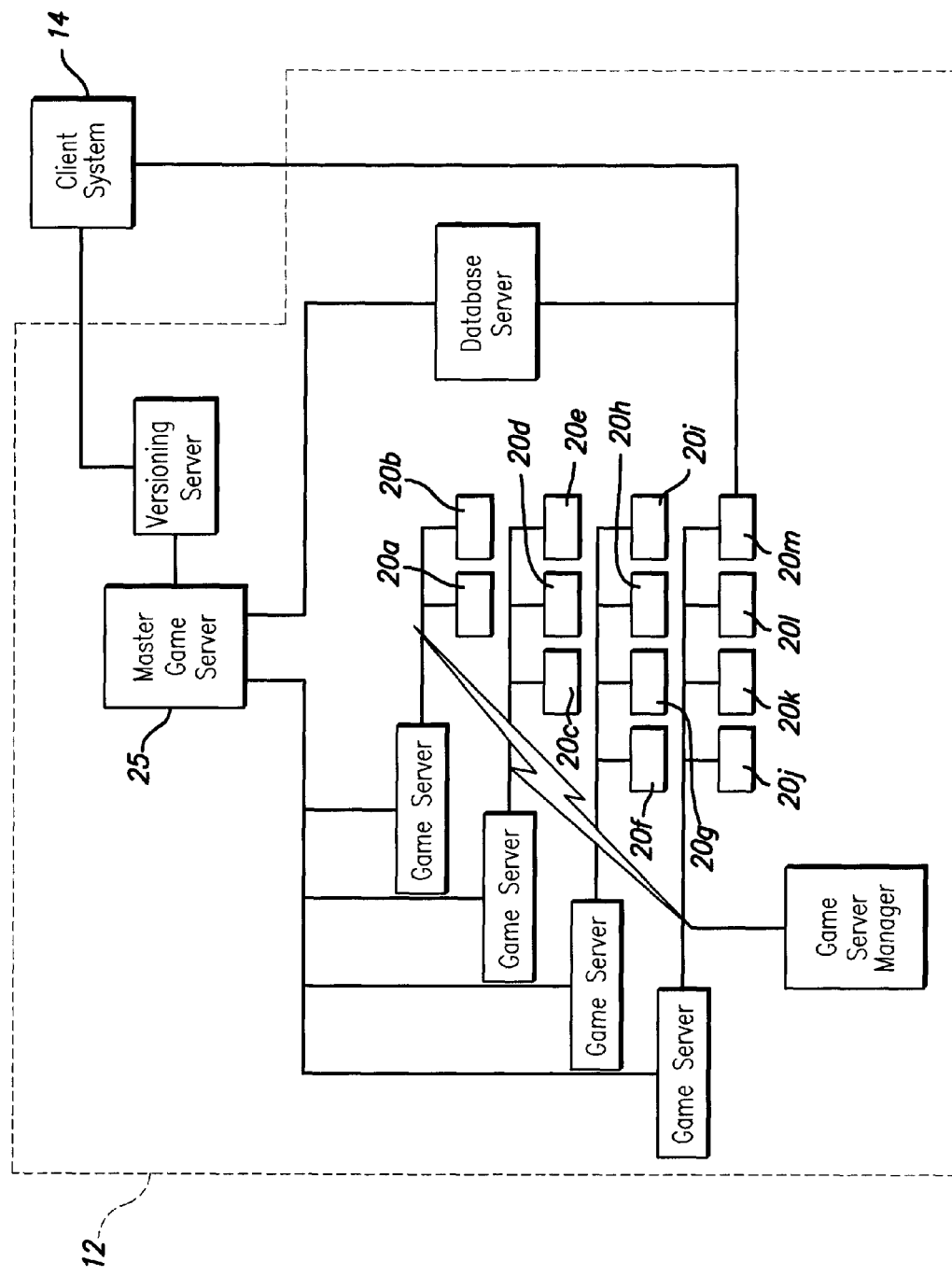
FIG. 2B is a block diagram of another exemplary embodiment of an electronic game-based learning system for providing a game-based learning environment(s), constructed in accordance with the present invention.

FIG. 2B is a block diagram of another exemplary embodiment of the electronic game-based learning system 10 for providing a game-based learning environment(s), constructed in accordance with the present invention. The system 10 includes at least one host system 12 communicating with one or more client systems 14 via a network to provide the game-based learning environment(s) to at least one user. In this embodiment, the host system 12 comprises at least two servers for providing the client application 20 to the client system 14. For example, as illustrated in FIG. 2B, the host system 12 is comprised of a master game server 25, a database server, 26, at least one game server 27, and a game server manager 28. Additionally, the host system 12 may comprise a versioning server 29. Although each of the above listed components are associated with the host system 12, it should be apparent to one skilled in the art, that a third party system may provide the functionality of one or more of the above listed components.

Generally, the user access the client system 14 and the client system 14 queries the versioning server 29. The versioning server updates the client application 20 and/or portions of the client application 20 stored on the client system 14. For example, if the versioning server 29 determines that the client system 14 does not contain the current version of the client application 20 and/or portions of the client application 20, the versioning server 29 may prompt the user to download a patch to update the client system to the latest release of the client application 20. Once, the client application 20 and/or portions of the client application 20 are determined to be up to date, the client system may be connected to the master game server 25.

The master game server 25 provides authentification of the user of the client system 14. Authentification of the user may be through a username and/or a password (such as a PIN), or any other suitable method within the art. In the preferred embodiment, authentication or verification of a user is through a username and password. The master game server 25 authenticates the user by comparing the user with a registered user list located in the database server 26. If the user is registered, the master game server 25 directs the client system 14 communications to at least one game server 27.

The game server 27 provides the client application and manages movements within the environment(s). The type, location, and/or number of game servers 27 within the system 10 may be based on design consideration. For example, if a learning institution desires deployment of the client application 20 on their available bandwidth, each game server 27 may be located on the institution's internal network. With the game server 27 in the institution's internal network, the majority of game-based traffic may be within the intranet of the institution. Alternatively, the game servers 27 may be located external to the institution's network. Locating the game servers 27 external to the institution's network may provide collaboration between multiple institutions.

FIG. 2B illustrates the use of four game servers 27a-d with the client system 14 communications being directed to game server 27d. Once the client system 14 communications are directed to the game server 27d, the game server manager 28 identifies which client application 20, the user belongs to and if the client application is active. If the client application 20 is active, the client system 14 communications are associated with that particular client application 20. For example, as illustrated in FIG. 2B, the client system 14 communications are associated with active client application 20m. If the client system 14 is the first client system 14 to attempt to login, the game server manager 28 may generate the client application $20_x$ (not shown) and direct client system 14 communication to the newly generated client application $20_x$ (not shown).

All communications and activities may be stored in the database server 26 during game play. For example, the database server 26 may log all communication by user, user group, client application, and/or any other suitable communication. Storage also may allow for the user of the client system 14 to save their completed scenarios and/or tasks for future retrieval. Preferably, communications and activities are stored in real-time such that if the client system 12 is disconnected from the host system, the user of the client system 14 may return to substantially the same place within the environment(s) before disconnection occurred.

Figure 3:
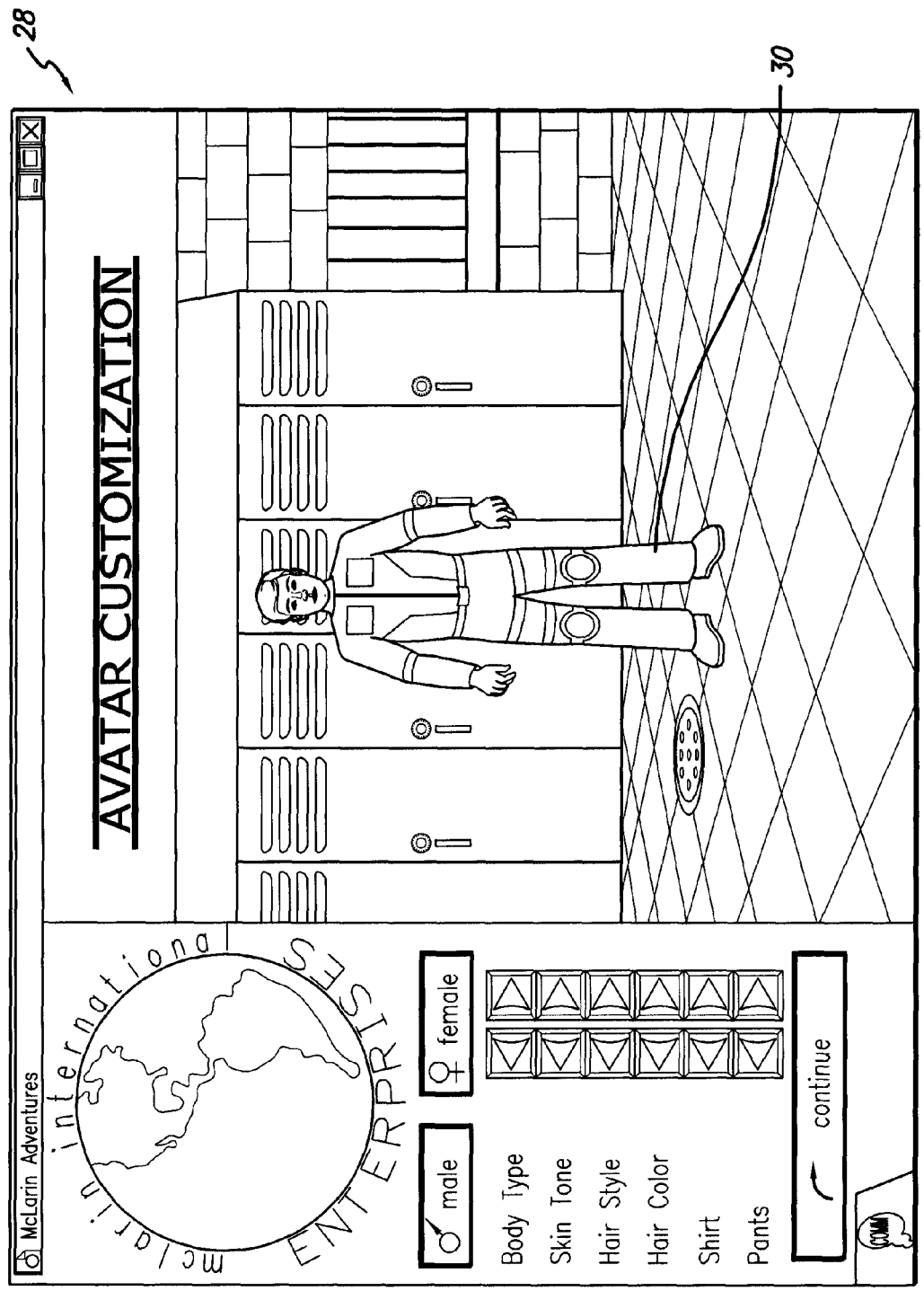
FIG. 3 is a pictorial representation of a screenshot illustrating customization of an avatar for use within a game-based learning environment(s) provided by the electronic game-based learning system of FIG. 1 or FIG. 2.

Upon registration and/or authentication of the user to the host system 12, the client application 20 allows for the creation of an avatar 30. The avatar 30 is a two-dimensional or three-dimensional graphical representation of the user within the game-based learning environment(s). FIG. 3 is a screenshot 28 of an exemplary avatar 30 for use within the game-based learning environment(s). The avatar 30 is generally provided as a basic character model, or template. The user is provided with the opportunity to customize physical features of the avatar 30. For example, the user may customize the avatar 30 body type, skin tone, hairstyle, hair color, clothing, and/or other similar characteristics.

Movement of the avatar 30 within the virtual environment(s) may be, for example, through a keystroke, a series of keystrokes, touchscreen, joystick, or other means of manipulation. For example, keystrokes such as the up arrow, down arrow, left arrow, and right arrow may direct the avatar 30 to move in a forward direction, reverse direction, left direction, and right direction respectively. Additionally, the avatar 30 may be programmed for activity movements such as running, jumping, swimming, flying, skipping, crawling, eating, drinking, and/or the like.

3. Exemplary Scenarios and Tasks within the Client Application

The electronic game-based learning system 10 provides users a mechanism to interact in the virtual environment(s) while teaching concepts and skills based on national learning standards, state learning standards, and/or the like. These concepts and skills are preferably provided in a real-world context giving users experience in solving authentic problems.

Generally, the user interacts with the virtual environment(s) to complete a set of tasks. In particular, the tasks are designed to teach process skills to the user, rather than hand-eye coordination skills. Process skills are defined as engagement in physical or mental activities that require the user to combine processes and knowledge as they use reasoning, problem-solving, and critical thinking skills to develop an understanding on the content. For example, process skills include cognitive function exercises, including but not limited to observing, classifying, measuring, inferring, predicting, communicating, and using number relationships, modeling, defining operationally, collecting, analyzing, and interpreting data, identifying and controlling variables, formulating hypotheses, experimenting and other similar skills.

FIGS. 4-7 illustrate an exemplary embodiment of a system and method for providing a game-based learning environment(s) to the user. In this exemplary embodiment, the client application 20 is McLarin Adventures™, an animated virtual environment(s). Generally, McLarin Adventures™ directs the user through a series of scenarios having multiple tasks associated therewith and directed to developing process skills. Scenarios are designed to incorporate national teaching standards, state teaching standards, and/or similar teaching standards. For example, in one embodiment, McLarin Adventures™ includes objectives set out in the Priority Academic Student Skills (PASS) adopted by the Oklahoma State Board of Education.

Generally, McLarin Adventures™ is designed as a MMOG (Massive Multiplayer Online Game) in that it allows the user to make choices that determine the path of learning. As such, each individual user may progress through the game-based learning environment(s) at a different rate and experience different scenarios and/or tasks than other users within the game-based learning environment(s).

McLarin Adventures™ follows a storyline based on a fictional eccentric trillionaire, Jonathan McLarin that has initiated a program to "colonize" another planet. In order to colonize another planet, Jonathan McLarin is searching for a group consisting of at least one scientist, at least one mathematician, and at least one journalist that will be able to survive with minimal supplies. In this regard, Jonathan McLarin has instituted a competition allowing users to audition for inclusion within the group.

The user's avatar 30 is placed on an island within the game-based learning environment(s). Once on the island, the user attempts to have their avatar 30 'survive' for a specified amount of time. Evaluation of the user is generally based objectives such as:

Identifying sources of food and water to survive;
Exploring the targeted island, including determination of a suitable base camp;
Building an infrastructure for a colony;
Submission of journals and photos documenting the colonization process; and,
Other similar objectives.

Users and/or the users' avatars 30 are able to interact with other users, administrators, and/or other Non-Player Characters (NPC) within the game-based learning environment(s). For example, the combination of communication (Chat) and physical (virtual) co-location of each user provides collaboration for completing a shared task.

Communications between each user and communications between administrator and users are stored on the client system 14, administrator system 16, and/or host system 12. For example, as previously described, communication between user, user groups, and the like may be stored on the database server 26 as illustrated in FIG. 2B. Stored communications allow for users and/or administrators to review such communications for content, conduct, and/or the like.

Within the animated virtual environment(s), the user may be provided guidance through at least one Non-Player Character (NPC). The NPC provides feedback to the user on general movements of the user's avatar 30, interaction of the user and/or the user's avatar 30, communication skills of the user and/or the user's avatar 30, and other similar features. For example, the NPC may direct the user to configure a map. The NPC may provide brief descriptions such as "standardize your map using a grid system" and/or methods of completing the task such as "use the laser pedometer that is provided to obtain an accurate reading of distance."

Figure 4:
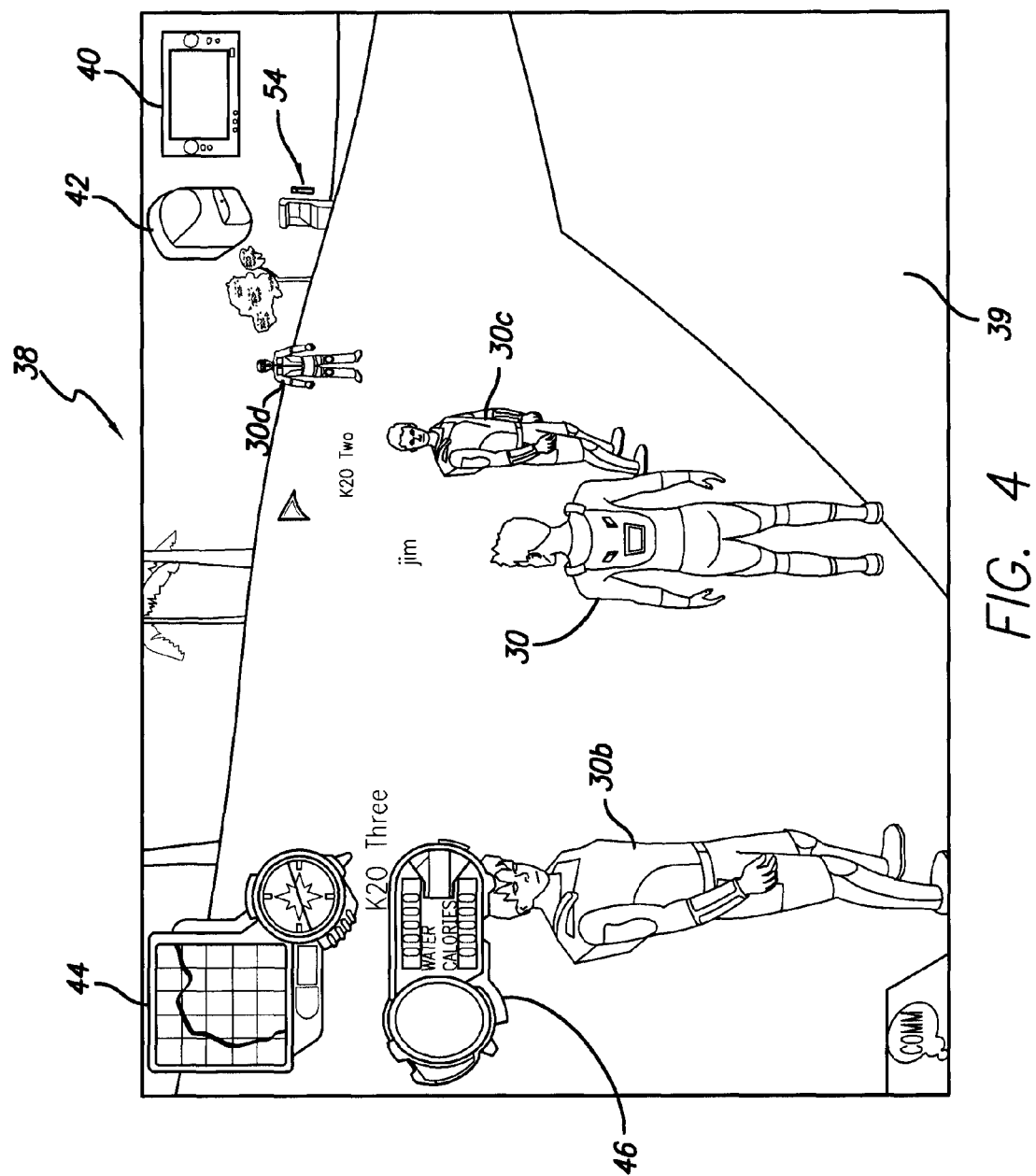
FIG. 4 is a pictorial representation of a screenshot illustrating a screenshot of an avatar within a game-based learning environment(s).
Figure 5:
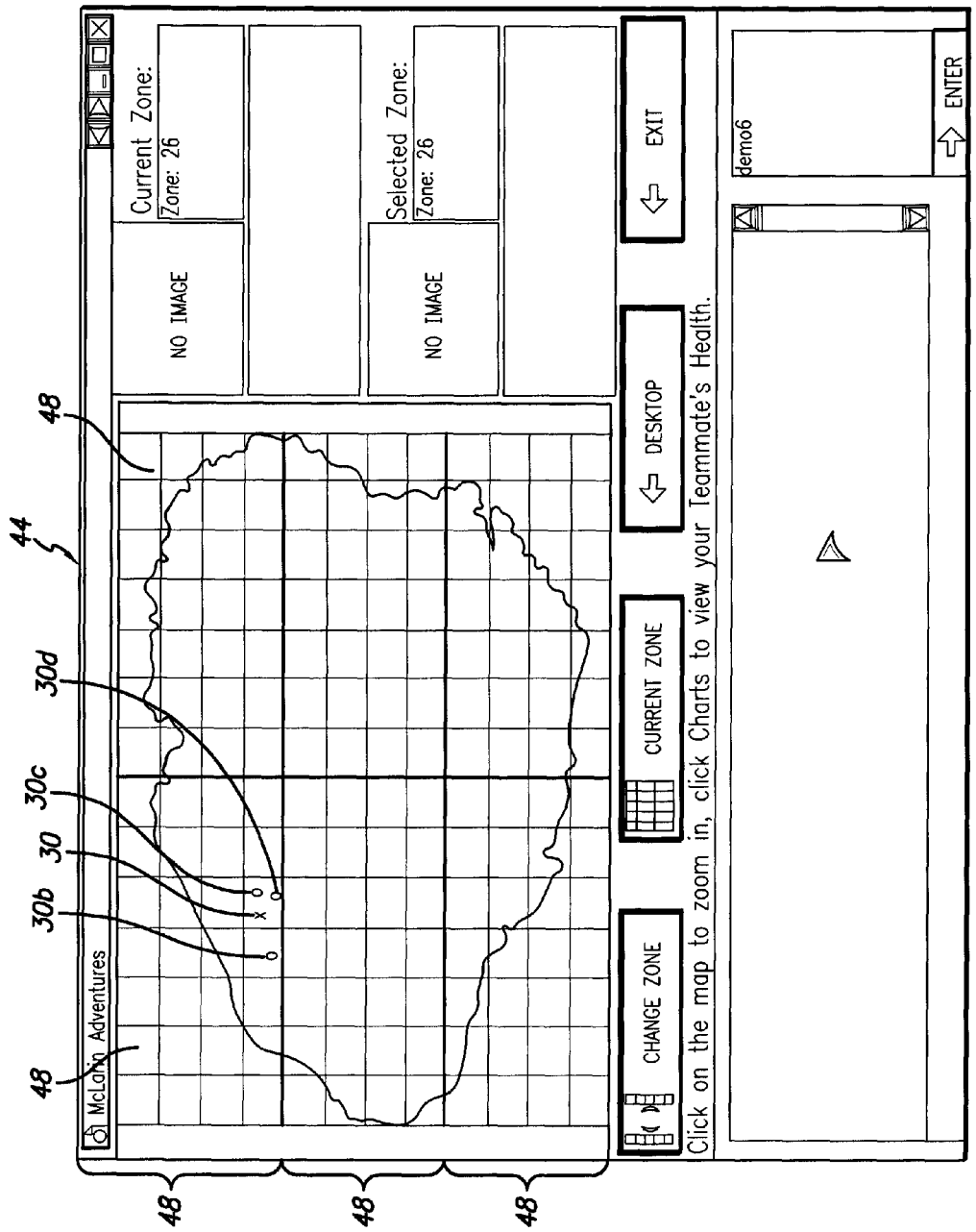
FIG. 5 is a pictorial representation of a screenshot illustrating an exemplary interactive map for use within a game-based learning environment(s).

FIG. 4 illustrates a screenshot 38 of the animated virtual environment(s) seen by the user. The screenshot 38 includes the user's avatar 30 and other users' avatars 30b-c in the virtual environment(s). The user's avatar 30 is adjacent to a body of water 39 within the virtual environment(s). Communication portal 54 can be seen in the distance. The user's avatar 30 may be provided access to several features including in-game application tools 40, process tools 42, an interactive map 44, a health meter 46, and other similar features.

In-game application tools, accessed by the UMPC icon numerically referenced by 40, allows users to collect, organize, and/or reflect on data collected within the game-based learning environment(s). Examples of in-game application tools 40 include journals, spreadsheets, report generators, e-mail systems, field manual, charts snap-shot pictures and graphs, and/or the like. Icons may be used to access the in-game applications within the game-based learning environment(s). As illustrated in FIG. 4, the UMPC icon illustrated by the numeral 40 provides access for the use of the in-game application tools.

Users may also have access to process tools 42 within the game-based learning environment(s). Process tools 42 include thermometers, pedometers, pH meters, cameras and other similar equipment that typically allow the user to perform an action. For example, a pedometer may be used within the game-based learning to measure the distance between a point A and a point B within the virtual environment(s). As illustrated in FIG. 4, the backpack icon provides access for the use of the process tools 42.

Users may also be provided with an interactive map 44 for determining the location of the user's avatar 30 within the virtual environment(s). The interactive map 44 may, for example, be based on a Cartesian coordinate system, curvilinear coordinate system, polar coordinate system, or other similar mapping system. The location of other users and/or the administrative may also be provided on the interactive map. For example, the exemplary interactive map 44 illustrated in FIG. 5 indicates the user's avatar 30 location with an X and the location of other users' avatars with circles. Additionally, the interactive map may be divided into one or several zones. Zones 48 provide geographical reference points for the user. Additionally, users may direct the user's avatar 30 to move into different zones 48 within the interactive map 44 correlating to different areas within the virtual environment(s).

In one embodiment, users are provided a health meter 46 and held accountable for maintaining the user avatar's 30 levels of hydration and nutrition at a specific level. For example, a pre-determined hydration level ($H_L$) and a pre-determined nutrition level ($N_L$) may be provided as base levels for comparison. The user is provided with a user hydration level ($H_U$) and a user nutrition level ($N_U$). During game play, the user hydration level ($H_U$) and the user nutrition level ($N_U$) may increase or decrease based on a consumption activity or a depletion activity. Consumption activities, such as the consumption of water by the avatar 30, the consumption of food by the avatar 30, and or other similar occurrences, generally increase the hydration level and/or the nutrition level. Depletion activities, such as the passage of time during gameplay, the amount of activity of the avatar 30, and/or other similar occurrences, generally decrease the hydration level and/or nutrition level of the avatar 30. Status of the hydration level ($H_U$) and/or nutrition level ($N_U$) of the avatar 30 may be graphically represented by icons. For example, an acceptable hydration level ($H_U$) and/or nutrition level ($N_U$) of the avatar 30 may be indicated by a smiley face within a health meter. If hydration level ($H_U$) and/or nutrition level ($N_U$) of the avatar 30 is close to the pre-determined hydration level ($H_L$) 40 and/or the pre-determined nutrition level ($N_L$), red bar within the health meter may appear. Further, if the hydration level ($H_U$) and/or the nutrition level ($N_U$) of the avatar 30 are less than the pre-determined hydration level ($H_L$) 40 and/or the pre-determined nutrition level ($N_L$), (e.g. $H_U < H_L$ and/or $N_U < N_L$), the user's avatar 30 is provided a NPC medic to raise the hydration level and/or nutrition level such that $H_U > H_L$ and/or $N_U > N_L$. However, with the raising of the hydration level and/or nutrition level by the NPC medic, the user may be asked to restart the game-based learning environment(s) at the last successfully completed scenario. The icons and indicators described above are exemplary in nature and it should be understood that other icons and/or indicators may be used based on design considerations.

The user's avatar 30 may be able to gather and store items for consumption. For example, the user's avatar 30 upon approaching a virtual banana tree may be provided an interactive menu with choices such as harvest one fruit, harvest all fruits, count all fruits, return, and/or other similar choices. If the user selects the harvest one fruit option, the user may be provided with a second interactive menu with choices such as eat object, store object, discard object, and/or other similar choices. By selecting to store the object, the user may store the fruit for later consumption as needed.

In one embodiment, the user is provided with a nutritional analyzer to determine whether the food item is suitable for ingestion. For example, the user may query the nutritional analyzer to provide caloric content, nutritional analysis, and/or other similar features of the food item. Based on the information provided by the nutritional analyzer, the user may then determine whether the food item is suitable for ingestion, e.g. increase the avatar nutrition level $N_U$.

Training Zone

The user may optionally be provided a virtual training zone to instruct on the use of tools, such as the in-game application tools and/or process tools, within the game-based learning environment(s). In the training zone, users direct the user's avatar 30 to follow a pre-determined path and encounter a series of stations.

Figure 6:
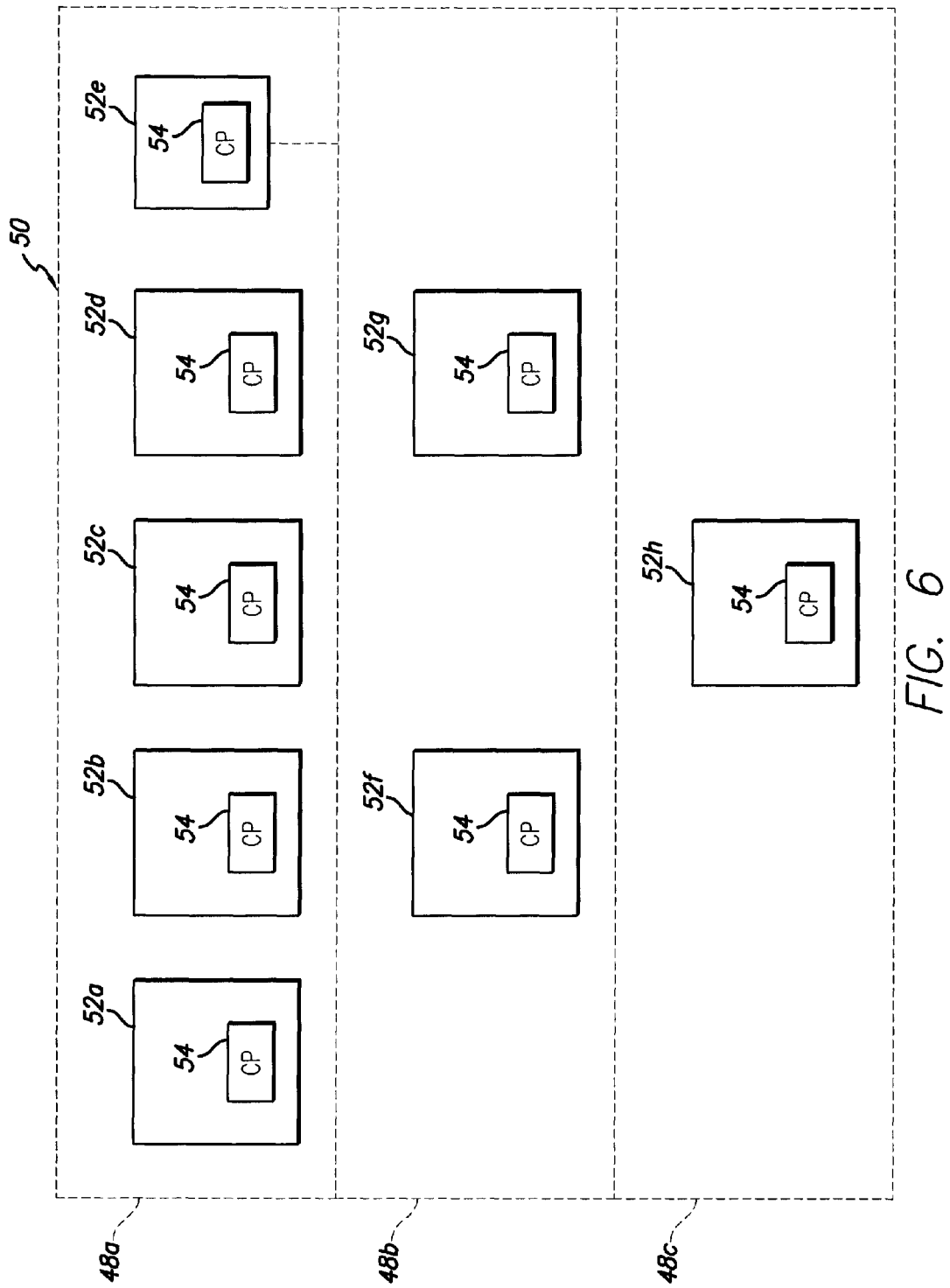
FIG. 6 is a block diagram of an exemplary training zone for use within a game-based learning environment(s).

FIG. 6 illustrates an exemplary training zone 50 having eight separate stations 52a-h within three zones 48a-c. Stations 52a-e are within zone 48a; stations 52f-g are within zone 48b, and station 52h is within zone 48c. For purposes of clarity, the training zone 50 is illustrated as a block diagram, but it should be understood to one skilled in the art that the training zone 50 may be animated within the virtual environment(s).

Each station 52a-h provides information to the user regarding movement of the avatar 30, manipulation of the virtual environment(s), and/or other similar features. Each station 52a-h within the training zone includes at least one communication portal 54. The communication portal 54 provides information and/or requests an action from the user's avatar 30. Generally, the user directs the user's avatar 30 to complete the requested action before progressing the avatar 30 to the next communication portal and/or station 52.

FIG. 6 illustrates exemplary information and/or actions the user and/or the user's avatar 30 may encounter at each particular station within the training zone. For example, the communication portals at stations 52a and 52b generally provide overview information to the user regarding particular features within the game-based learning environment(s). Station 52a provides the user information regarding the functions of the interactive map 44 including the location of the user's avatar 30 and zones 48 within the interactive map 44. Additionally, the user is provided information regarding the health meter 46, and the ability to access process tools 42 and in-game application tools 40 within the game-based learning environment(s). Further, the user is provided information on how to communicate with other users.

Station 52b provides the user additional background information regarding the game-based environment(s) and additional information regarding tools and/or features.

At station 52c, the user directs the user's avatar 30 to perform a requested action from the communication portal 54 using a specific process tool 42, such as, for example, the laser pedometer. For example, the user may be instructed as to how to use laser pedometer to obtain a measurement between two points, point A and point B. Specifics on using process tools and/or in-game application tools are discussed in further detail below.

Station 52d of FIG. 6 instructs the user on how to accomplish a water task. For example, the user may be instructed on how to use the process tools associated with water such as the water probe, pH meter, and other similar process tools.

Station 52e instructs the user on the concepts associated with interactive map 44. For example, the user is instructed on the need to consider the amount of resources, e.g. hydration level and nutrition level, that the user and/or the users have before changing between zones within the interactive map 44. Information may be provided to the user in the form of a bar graph representing the amount of hydration and/or nutrition in the avatar's current state and the amount of hydration and/or nutrition needed to move to a particular zone within the interactive map 44. This provides the user opportunities to analyze the data presented and device, such as, for example, by voting between users whether there are enough resources to move to the other zone.

Station 52f introduces the user to in-game applications such as the journal, spreadsheet, e-mail systems, and the like. For example, the communication portal may ask the user to retrieve the journal and change the title of reports within the journal to be more specific. The communication portal may instruct the user on how to use the spreadsheet by requesting, for example, that the user obtain measurements from barrels of water and enter data based on the measurements into the spreadsheet.

Station 52g instructs the user on how to use another in-game application, such as the reporting function. The user is asked to write a report using the in-game report application. For example, the user may be asked to write a report based on the data collected from the barrels of water in Station 52f. Once the report is completed, the report may be stored for future retrieval by the user and/or administrator.

Station 52h provides users with Meals Ready to Eat (MREs). MREs may be stored and provided to the user's avatar 30 as a consumption activity to increase the nutrition level ($N_U$) as previously discussed. Additionally, the user's avatar 30 may be provided water bottles capable of being filled with water. Consumption of the water by the user's avatar 30 may be considered a consumption activity capable of increasing the hydration level ($H_U$) as previously discussed. Station 52h also provides a mechanism for exiting the training zone.

The following scenarios provide user interaction through a series of scenarios with the virtual environment(s) in which the user completes a set of tasks. In particular, the tasks are designed to teach process skills to the user. The scenarios and tasks discussed below are exemplary in nature and are not to be considered limiting of the electronic game-based learning system 10.

As previously described, the user's avatar 30 is placed on an island within the game-based learning environment(s). Once on the island, the user attempts to have their avatar 30 'survive' for a specified amount of time. For example, a time limit may be provided in which the user must complete all tasks. If the user does not complete the tasks in the specified time limit, the user may be asked to leave the game-based learning environment(s) and/or restart the game-based learning environment(s). For example, the user may be asked to restart the game-based learning environment(s) at the first scenario. FIGS. 7a-7e illustrate exemplary tasks and/or tools used for the tasks within the scenarios described below. Although the scenarios are listed in numerical order, it should be noted that the user may encounter the scenarios and/or tasks in any order and are not limited to the numerical equivalents.

Generally, the user's avatar 30 may be provided with a set of process tools, such as, for example, a flashlight, rope, hatchet, pH/Alkalinity probe, Temp/$O_2$ probe, laser pedometer, a hoverbot (for obtaining volume, surface area, and/or depth of a specified area of the island and/or body of water), a spectrophotometer, and/or other similar tools for use within the virtual environment(s).

In the preferred embodiment, the island environment(s) is programmed to have a select number of bodies of water and a select number of landforms. Pre-determined information regarding each body of water and each landforms is stored for analysis by the user. For example, each body of water within the island is programmed to provide to the user the temperature, pH, alkalinity, surface area, average depth, volume, and/or other quantitative and qualitative characteristics. The mechanism for providing such characteristics to the user is discussed in further detail herein below. Alternatively, the island environment(s) is programmed to randomly generate information regarding the bodies of water and/or landforms. For example, upon query, the user may be provided a randomly generated pH for a body of water. In another embodiment, upon query, the user may be provided a pH for a body of water wherein the percentage of error of the data is randomized. Having the percentage of error of data randomized allows the system 10 to track the user's ability to report the correct data.

Based on the quantitative and qualitative characteristics provided to the user regarding the bodies of water and/or landforms, the user may be requested to analyze and report the findings as further described herein below.

Scenario A

Scenario A generally is associated with locating water resources. The user within Scenario A will generally accomplish the following objectives:

- Measuring and creation of a scaled map and calculations of the area of the island;
- Geographical mapping of at least one landforms and/or at least one body of water;
- Measurements of area and volume of at least one body of water;
- Identification of usability of at least one body of water;
- Trial and error, hypothesizing, and mathematical determinations of water needs of the user's avatar 30 during exploration of the island;
- Technical writing and storage of at least one report regarding water sources identified, quality of water sources identified, possible uses of water sources identified, and/or the like.

Task $1_A$

Figure 7A:
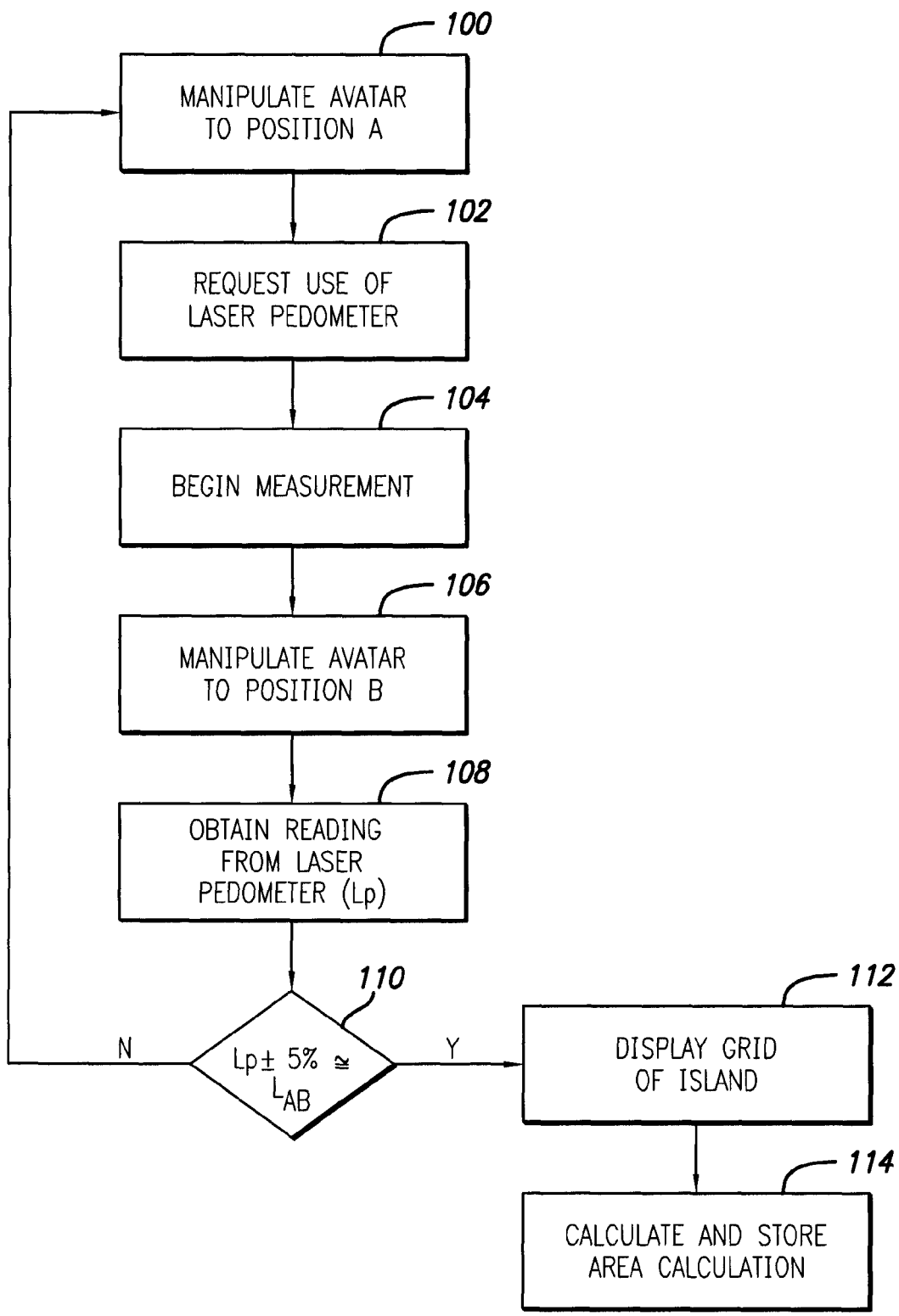
FIGS. 7a-7e illustrate exemplary scenarios, tasks, and/or tools used for the tasks within a game-based learning environment(s).

As illustrated in FIG. 7a, the user may be requested to configure the interactive map 44 by standardizing the map to a grid system. The user is provided to two points on the interactive map 44, point A and point B. The distance between point A and point B is pre-determined distance $L_{AB}$. The user manipulates the user's avatar 30 to point A as illustrated by 100, and requests the use of the laser pedometer as illustrated by 102. The user instructs the laser pedometer to begin measurement as illustrated by 104. The user then manipulates the user's avatar 30 to point B as illustrated by 106 and obtains a reading from the laser pedometer ($L_P$) as illustrated by 108. As illustrated by the decision tree in 110, If the measurement obtain from the laser pedometer ($L_P$) is within a 5% error margin of pre-determined distance $L_{AB}$, the interactive map 44 displays a grid system of the entire island as illustrated by 112. The user is then requested to calculate the total area of the island and report the findings as illustrated by 114. For example, the user may calculate the total area of the island and store the data within in-game applications such as the journal, spreadsheet, and/or reporting application. If the user does not obtain a measurement within a 5% error margin of the predetermined distance $L_{AB}$, the user is instructed to redetermine the distance from point A to point B using the laser pedometer.

Task $2_A$

In Task $2_A$, the user may be requested to record information regarding the virtual environment(s) of the island. For example, the user may be requested to obtain virtual photos of the virtual environment(s) using the camera process tool. Additionally, the user may be requested to descriptively recite features of the island within the journal process tool.

Additionally, the user may be given a time-line for providing an itemized inventory request. The itemized inventory request may include requests for items associated with consumption activity to increase the hydration level ($H_U$) and/or nutrition level ($N_U$) of the user's avatar 30. For example, a time limit of 14 days within the game-based learning environment(s) may be given as a deadline for submitting the itemized inventory request. This activity engages the user in trial and error, hypothesizing, and mathematical determinations of water and nutrition needs of the user's avatar 30 during exploration of the island.

Task $3_A$

Figure 7B:
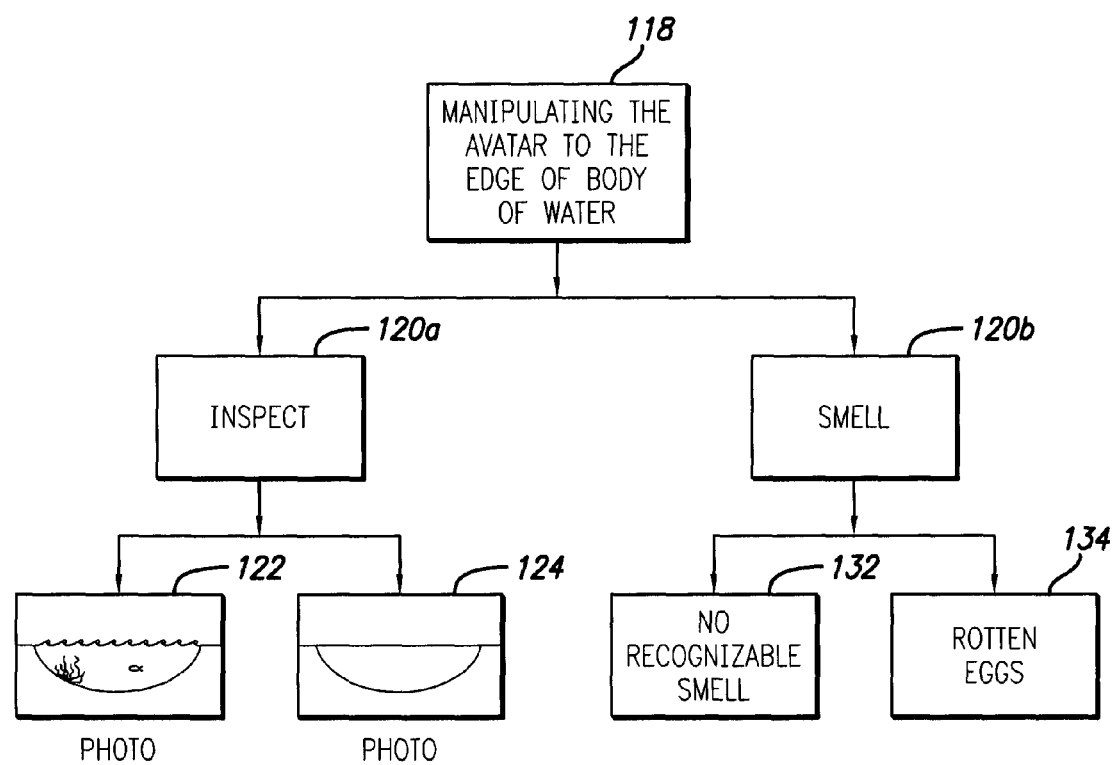

In Task $3_A$, the user may be requested to identify water sources. As illustrated in FIG. 7b, the user manipulates the user's avatar to at least one body of water within the virtual environment(s), illustrated as 118, to provide options for identification and/or qualification of the water, illustrated as 120. For example, as illustrated in FIG. 7b, the user may be presented with options such as inspect, smell, taste, drink, and the like.

If the user queries to inspect the body of water as illustrated by 120a, a virtual photograph may be provided in the window and/or within a separate window. The virtual photograph illustrates the visual quality of the body of water. For example, the virtual photograph may illustrate the body of water as clear with light vegetation and fish illustrated as 122. Alternatively, the virtual photograph may illustrate the body of water as murky illustrated as 124.

If the user queries to smell the body of water illustrated as 120b, the user may be provided with a dialogue box having a written description of the smell. For example, written descriptions of the smell may include statements such as, no recognizable smell illustrated as 132, smells of rotten eggs illustrated as 134, and/or other similar statements. Additionally, smell icons or pictures associated with smells (e.g. icons of a rotten eggs) may also be used.

Process tools provide the user with the ability to test qualitative and quantitative factors relating to the body of water. Exemplary process tools include, but are not limited to:

- pH and Alkalinity Probe to test the pH and alkalinity of the body of water;
- Temperature/$O_2$ Probe to test the temperature and oxygen content of the body of water;
- Hover-bot to obtain the surface area and average depth of the body of water;

For example, the user in testing the pH of the body of water will manipulate the avatar 30 to the edge of the body of water and select the pH and alkalinity probe. Upon selection of the probe, the application will provide a pre-determined, or randomly generated pH, and alkalinity measurement of the body of water. The user may import the data into in-game process applications such as, for example, the journal, spreadsheet, report application, and/or the like for future retrieval. The user may further customize the data within the in-game process application. For example, the user may alter the name of a journal entry containing the data as pH and Alkalinity of Body of Water X. Alternatively, the user may discard the data.

Additionally, the user may customize the interactive map 44 with information regarding the body of water. For example, the user may add additional information such as a name for the body of water to the interactive map 44.

Task $4_A$

The user may be asked to create a report detailing the findings of the qualitative and quantitative measurements of the at least one body of water. For example, the user created report may provide a comparison of several bodies of water ranked based on the different physical tests performed by the user. For the ranking, the user may be asked to select a specified number of bodies of water deemed to be suitable for further testing. For example, a suitable body of water may be considered suitable for further testing if it may be a reliable source of hydration based on the qualitative and quantitative measurements. The user may use any of the in-game applications to compile the data and store the data within the report for submission including, but not limited to, the spreadsheet, journal, report application, and/or the like.

Upon submission of the report, the user may be provided with one of several outcomes. For example, if the report requests the user to rank five bodies of water suitable for further testing, the following outcomes may be used:

If five of the five bodies of water meet or exceed minimum requirements based on the qualitative and quantitative measurements provided in the report, the user may be asked to further collect a pre-determined amount, e.g. 15 mL of water, for further testing.

If two-four of the five bodies of water meet or exceed minimum requirements based on the qualitative and quantitative measurements provided in the report, the user may be asked to further collect a pre-determined amount, e.g. 15 mL of water, from each of the bodies of water that meet or exceed the minimum requirements. Additionally, the user may be asked to update the user's report with any additional quantitative and/or qualitative measurements from additional bodies of water that the user's avatar 30 may come into contact during exploration.

If one or zero of the five bodies of water meet or exceed the minimum requirements based on the qualitative and quantitative measurements provided in the report, the user may be asked to conduct further quantitative and/or qualitative measurements on additional bodies of water, update the user's report, and resubmit the user's report.

Scenario B

Scenario B generally is associated with identifying regional climate and suitable shelter environment(s) within the island. The user within Scenario B will generally accomplish the following objectives:

Identifying the consequences of regional climate changes such as rain, snow, severe weather, and/or the like and identifying strategies to avoid and/or mitigate such consequences;

Locating natural landforms for use as suitable shelter environment(s);

Measuring dimensions of shelter environment(s) and scaling the dimensions;

Determining possible uses of shelter environment(s) and quantity of shelter environment(s) within the island;

Communicating using formal and/or informal dialogue.

Task $1_B$

The user may encounter weather conditions while in the game-based environment(s) such as rain, snow, severe weather, and/or the like. Additionally, the time based changes, including sunrise, sunset, nightfall, and daytime, may be provided within the game-based learning environment(s).

Weather conditions and/or time-based changes may provide a mechanism for encouraging the user to find suitable shelter environment(s), such as, for example, caves, tree cover, housing, and/or the like. For example, rain may damage certain elements needs by the avatar 30, such as those elements associated with consumption activity that increase the hydration level ($H_U$) of the user's avatar 30. As previously described, lack of consumption activity may cause the health meter to fall below the pre-determined hydration level ($H_L$) causing the user to restart the last successfully completed scenario. As such, placing food, water, and/or equipment within a suitable shelter environment(s) protects the food, water, and/or equipment from elements including rain-limiting damage.

In finding suitable shelter environment(s), the user may be provided, but not limited to, the following process tools:

Laser pedometer to determine the distance of the shelter;

Volume laser measuring device to determine the volume of the shelter;

Temperature probe to determine the temperature within the shelter;

Humidity probe to determine the relative humidity within the shelter.

For example, the user may select to use the Temperature probe to determine whether the temperature within the shelter is suitable for habitation. Upon selection of the Temperature probe, a pre-determined temperature or randomly generated temperature is provided to the user. The user may store the temperature within in-game applications such as the journal, spreadsheet, report application, and/or the like for future retrieval.

Additionally, the user may customize the interactive map 44 with information regarding the shelter. For example, the user may add additional information such as a name for the shelter to the interactive map 44.

Task $2_B$

Similar to the classification of the bodies of water, the user may be asked to create a report detailing the findings of the qualitative and quantitative measurements of the shelter. For example, the user created report may provide a comparison of several shelters ranked based on the different physical tests performed by the user. For the ranking, the user may be asked to select a specified number of shelters deemed to be suitable for habitation based on the qualitative and/or quantitative measurements. The user may use any of the in-game applications to compile the data and store the data within the report for submission including, but not limited to, the spreadsheet, journal, report application, and/or the like. Based on the ranking, the user may store food, water, and/or equipments within one or more suitable shelters within the virtual environment(s).

Task $3_B$

The user may be requested to provide a formal or informal communication. For example, the user may be request to provide an informal e-mail communication detailing the findings and/or activities while in the game-based learning environment(s). Such communications provide a learning mechanism for the drafting of formal and/or informal communications including formatting and syntax.

Scenario C

Scenario C generally is associated with identifying the quality of water on the island. The user within Scenario C will generally accomplish the following objectives:

Recording of physical observations of at least one body of water;

Conducting further testing on at least one body of water and determining at least one body of water suitable for drinking and sanitation;

Interpreting results of testing and identifying a single source of water for future settlement;

Communicating technical information using informal and/or formal dialogue.

Task $1_C$

In Task $1_C$, the user may be requested to provide a detailed report through the use of in-game applications such as the spreadsheet, journal, reporting application, and the like. For example, the user may be requested to rank bodies of water on the island according to suitability for drinking and sanitation. Using the spreadsheet application, the user may provide graphs and bar charts illustrating quantitative and/or qualitative features of the bodies of water such as oxygen content, volume, temperature, pH, alkalinity, surface area, average depth, and/or the like. Upon confirmation of the user provided report, the user's avatar 30 is provided at least one cuvet for the collection of water. The collection of water within the cuvet is provided to the communication portal for further testing by a field spectrophotometer water analysis system.

Figure 7C:
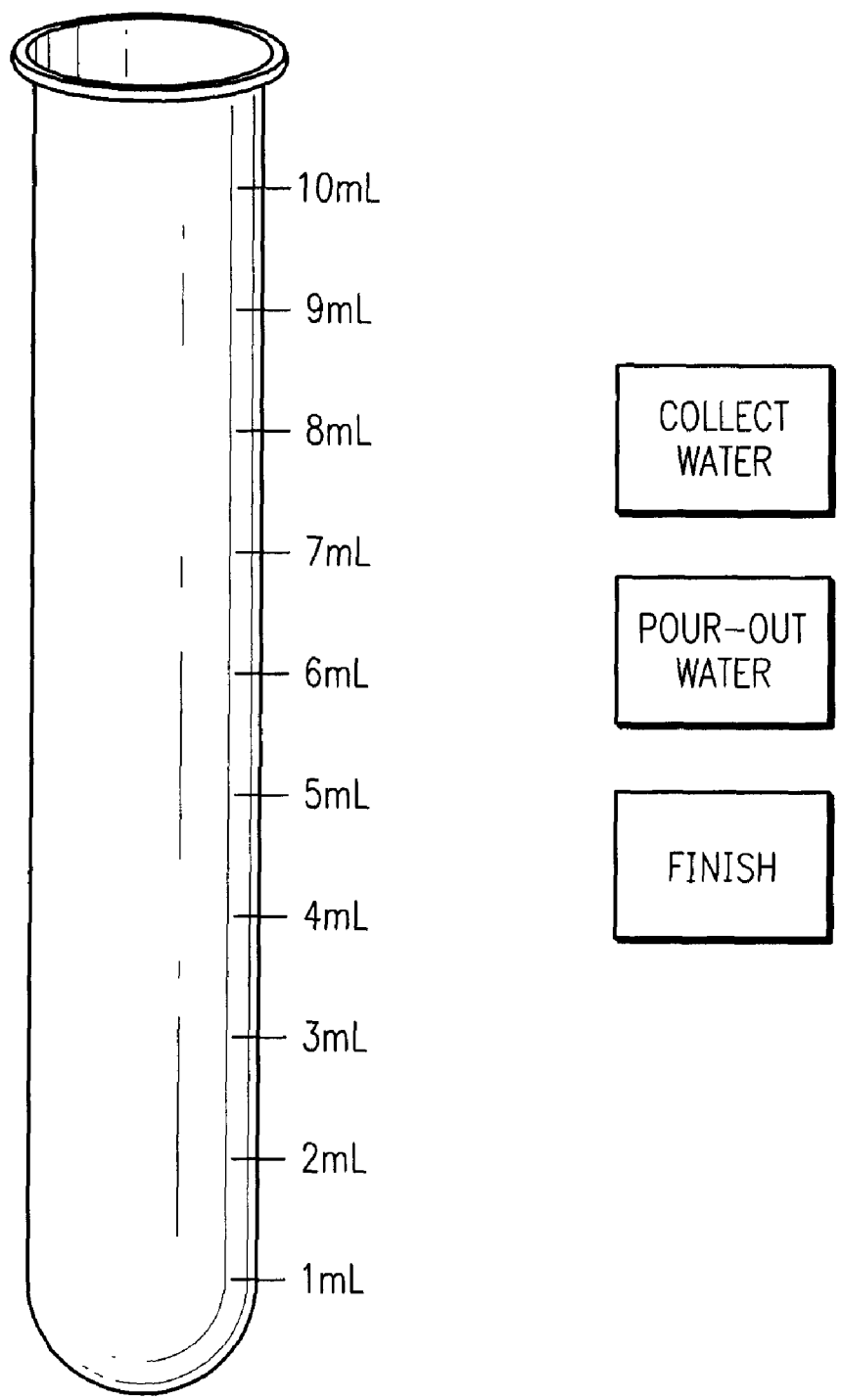

The field spectrophotometer water analysis system provides a detailed analysis of the body of water. Generally, the user directs the user's avatar 30 to collect a pre-determined amount of water, e.g. 15 mL, within a cuvet as illustrated in FIG. 7c. Once the pre-determined amount of water is collected, the cuvet is virtually returned to the communication portal to be virtually sent to a lab for testing within the field spectrophotometer.

Task $2_C$

As previously discussed, if the user manipulates the user's avatar to at least one body of water within the virtual environment(s), illustrated as 118, the user's avatar 30 is provided options for identification and/or qualification of the water, illustrated as 120. For example, the user may be presented with options such as, for example, inspect, smell, taste, drink, and the like.

Figure 7D:
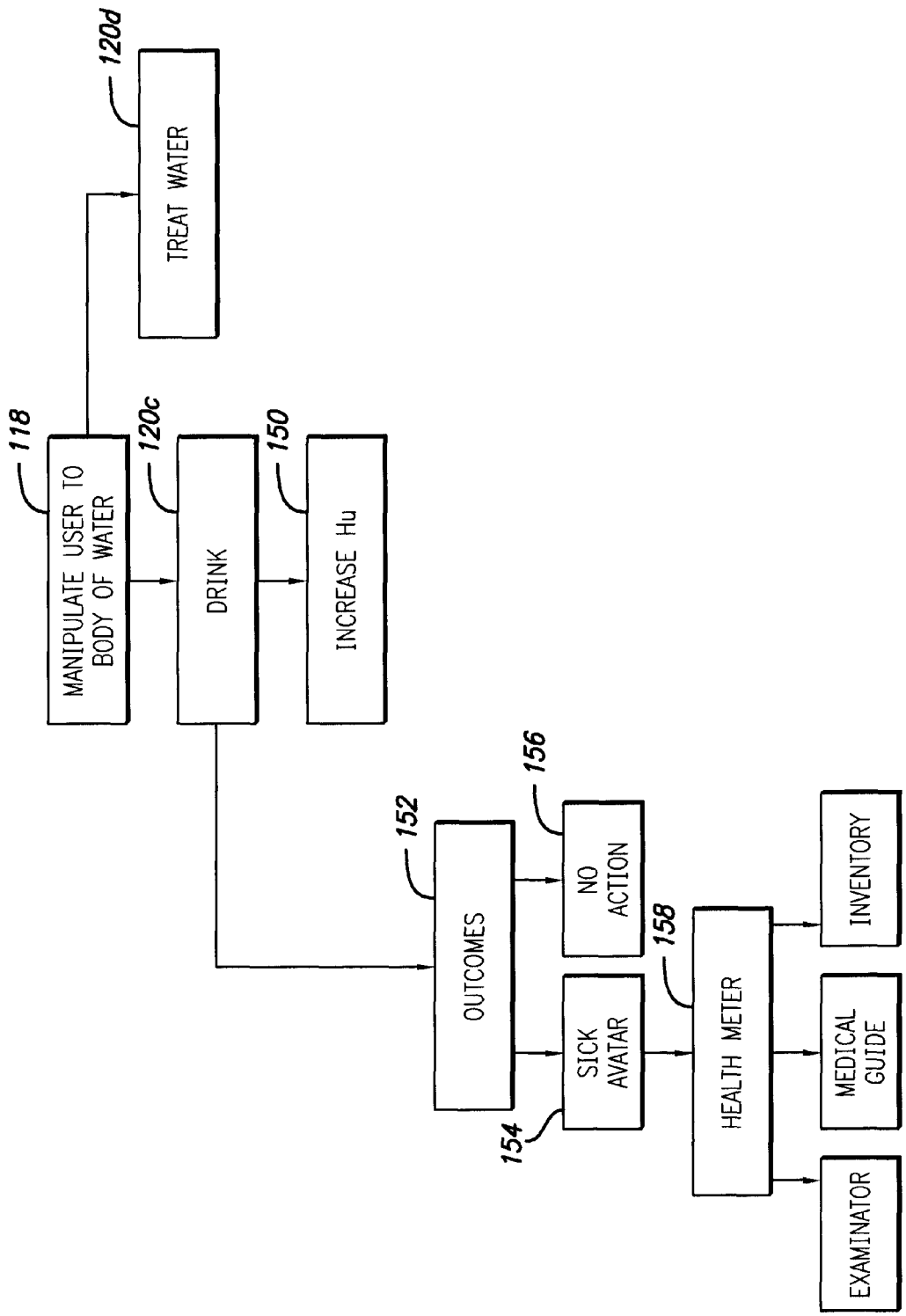

As illustrated in FIG. 7d, if the user queries the drink option 120c, the hydration level ($H_L$) of the user's avatar is increased, illustrated as 150. Upon drinking the water, the user's avatar 30 may be subject to one of several outcomes 152 including, but not limited to, sick avatar 154, no action 156, and/or the like. For example, the sick avatar outcome may be indicated to the user through the use of a cross and/or a depletion in the avatar's health meter. The avatar may be requested to obtain a reading from a virtual health machine 158 to conduct an examination of the avatar 30. Generally, the health machine 158 may provide the user with options such as conduct examination 160, consult medical guide 162, consult medical supply inventory 164, and/or other similar features.

In conducting an examination 160 on the health machine 158, the user may be provided with data regarding the avatar blood, blood pressure, oxygen/carbon dioxide, caloric content, temperature, and/or other similar characteristics. The health machine 158 may provide a diagnosis of the avatar's condition or the user may be asked to diagnose the avatar's condition. For example, the health machine 158 may provide a diagnosis to the user that the avatar, by ingesting the water, has ingested *E. Coli*. Additionally, the health machine may provide a remedy and/or request the user to prescribe a remedy to restore the health of the avatar 30.

Figure 7E:
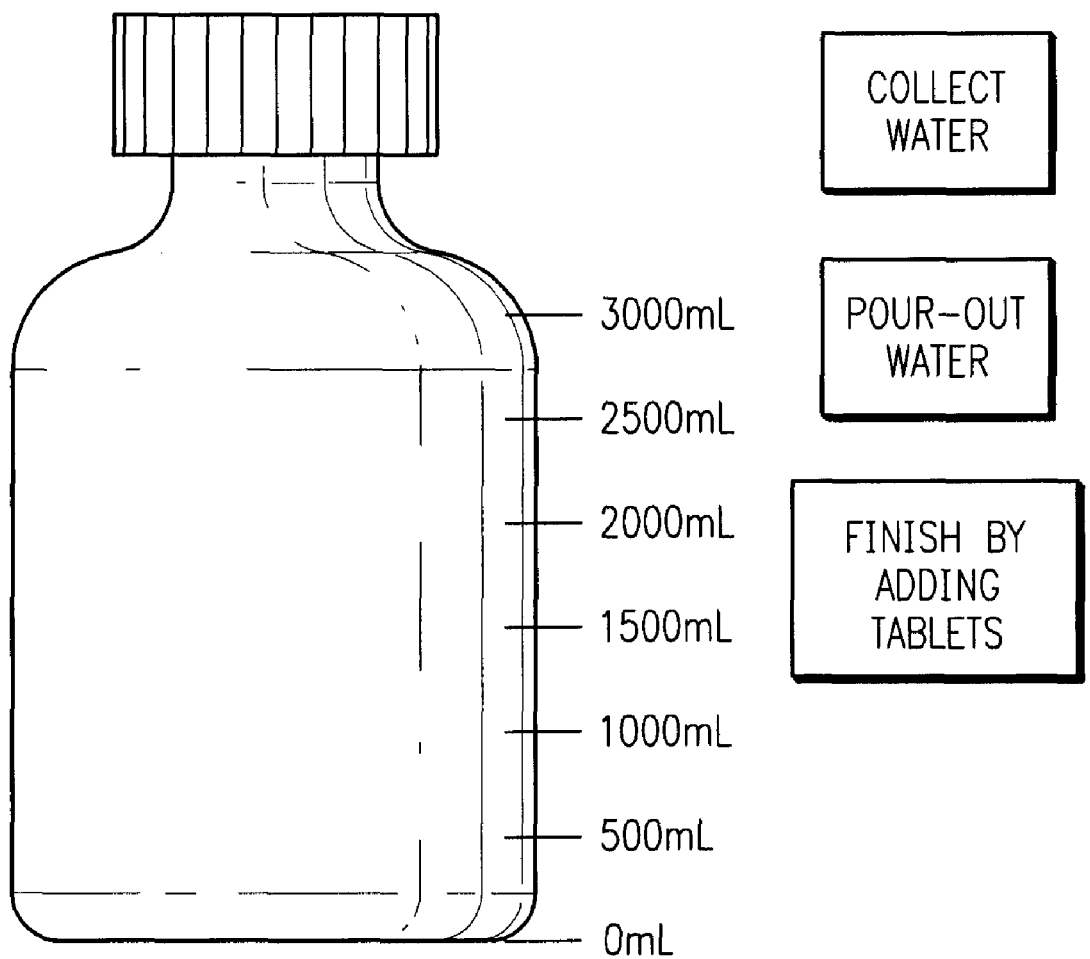

In one embodiment, the user is able to treat the body of water or at least a portion of the body of water for suitability in drinking and sanitation. For example, the user may manipulate the user's avatar 30 to the body of water, as illustrated by 118. The user selects the option to treat the body of water, illustrated by 120d. The user may be requested to obtain a pre-determined portion of water within a bottle as illustrated in FIG. 7e. The user's avatar 30 is provided with tablets. The tablets when added to the water treat the water for suitability in drinking and sanitation. The user may be requested to provide the precise amount of water for use with the tablets. For example, the user's avatar 30 may be provided with two tablets for treating 1.5 L of water. The user analyzes and converts between mL and L to provide the precise amount of water for use with the selected number of tablets provided. If the user adds more water or less water than needed, the water is provided as unsuitable for drinking and sanitation. If the user adds the precise amount of water for use with the selected number of tablets provided, the water is considered suitable for drinking and sanitation.

Task $3_c$

The user may be requested to provide a formal or informal communication. For example, the user may be request to provide an informal e-mail communication detailing the findings and/or activities while in the game-based learning environment(s) to other students. The e-mail communication may detail the analysis and determinations made during testing of the island environment(s), e.g. bodies of water and/or landforms. Such communications provide a learning mechanism for the drafting of formal and/or informal communications including formatting and syntax.

Figure 8:
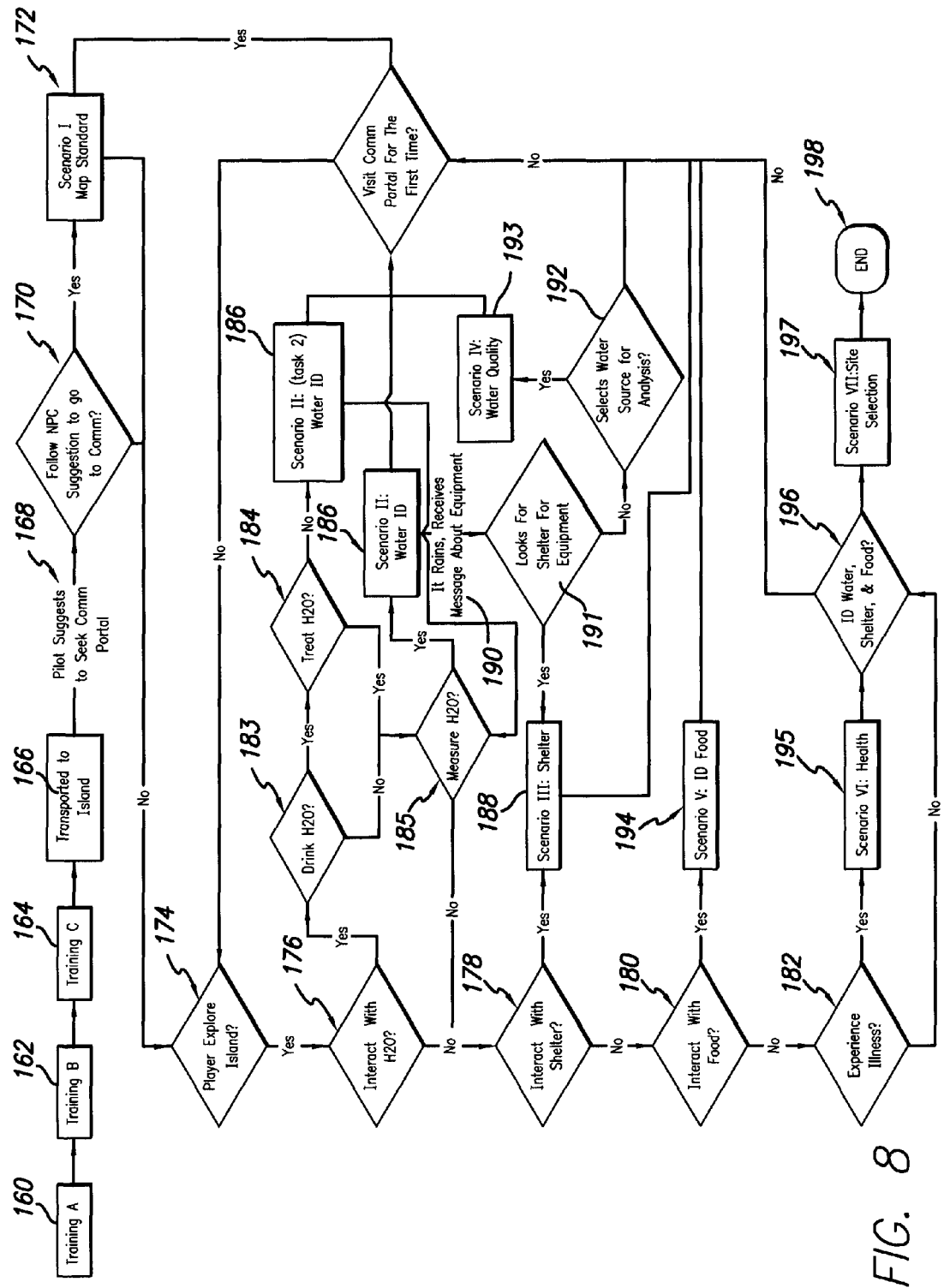
FIG. 8 is a flow chart illustrating exemplary training zones, scenarios within a game-based learning environment(s).
Figure 9:
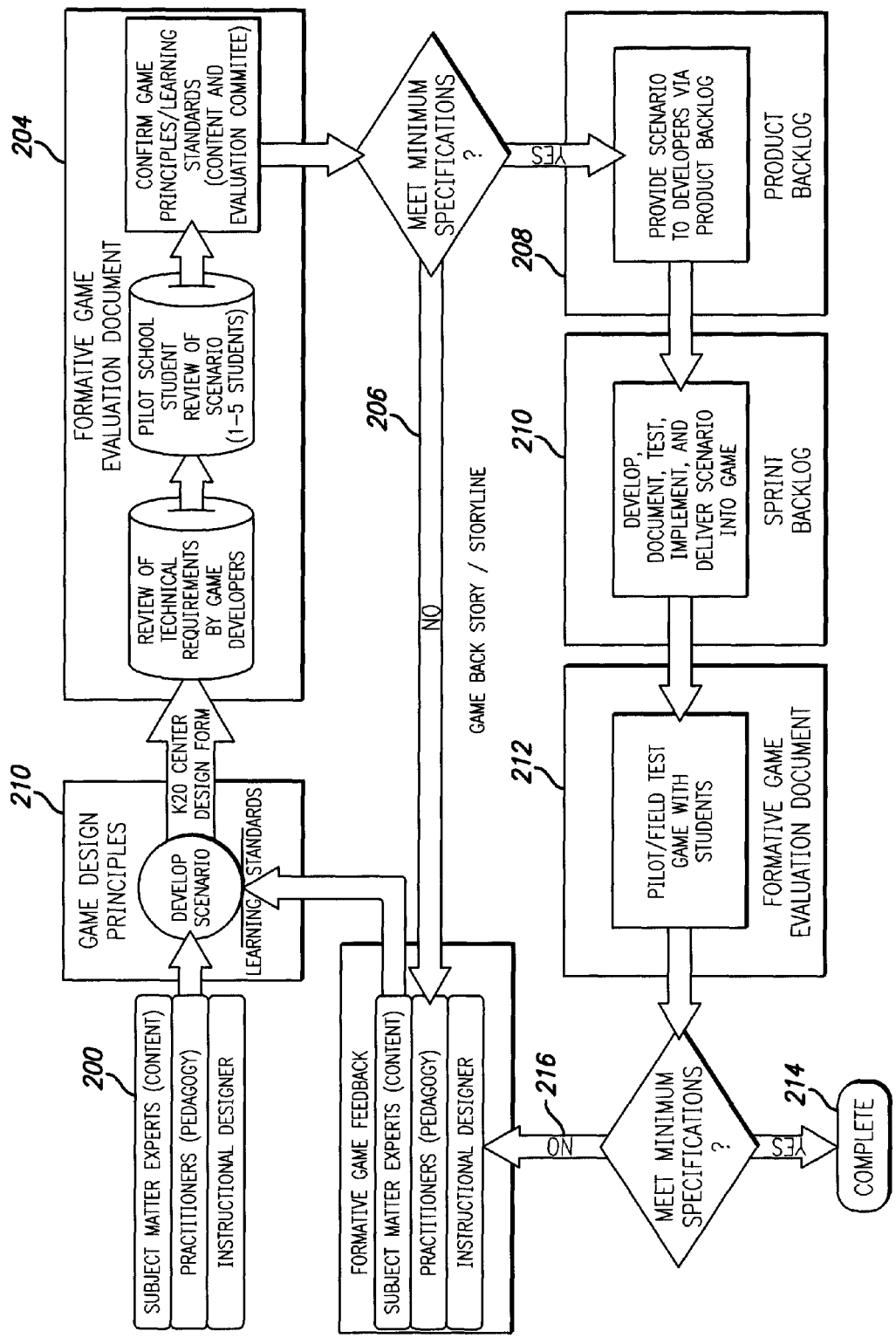
FIG. 9 is a block diagram illustrating a method of providing a scenario for a game-based learning environment(s).

FIG. 8 illustrates a flow chart of another embodiment of the game-based environment. In this embodiment, the user encounters three training zones: training zone A 160, training zone B 162, and training zone C 164. As previously described, the training zones 160, 162, and 164 generally provide the user instruction on the use of tools, such as the in-game application tools and/or process tools, within the game-based learning environment(s).

Upon completion of the training zones 160, 162, and 164, the user's avatar is transported to the island environment as illustrated by 166. A NPC suggests that the user's avatar 30 find a communication portal within the game-based environment, as illustrated by 168. It is the user's choice to seek out the first communication portal or further explore the game-based environment, as illustrated by 170.

If the user manipulates the user's avatar 30 to the first communication portal, the user begins Scenario I—Map Standard 172. In Scenario I—Map Standard 172, the user may be requested to configure the interactive map 44 by standardizing the map to a grid system. Once completed, the user may explore the game-based environment, as illustrated by 174.

During exploration of the game-based environment, the user may interact with different features of the environment including water 176, shelter 178, and/or food 180. Additionally while exploring the game-based environment, the user may experience illness, as illustrated by 182. Interacting with the game-based environment provides the user with scenarios. Each scenario provides user interaction through a series of tasks. In particular, the tasks are designed to teach process skills to the user.

For example, interacting with water provides three options to the user including drinking the water 183, treating the water 184, or measuring the water 185. If the user decides to measure the water 185 and/or treat the water 184, the user begins Scenario II—Water ID, illustrated by 186. In Scenario II—Water ID 186, the user may be requested to identify bodies of water within the environment(s). For example, the user may be requested to complete identification tasks such as obtaining measurements of area and volume of at least one body of water; identifying usability of at least one body of water, provide trial and error, hypothesizing, and mathematical determinations of water needs of the user's avatar 30 during exploration of the island; providing at least one report regarding water sources identified, quality of water sources identified, possible uses of water sources identified, and/or the like; and/or other similar identification tasks.

If the user decides to interact with the shelter, 178, the user begins Scenario III—Shelter, illustrated by 188. In Scenario III—Shelter, the user may be requested to perform shelter identification tasks such as using the laser pedometer to determine the distance of the shelter; using the volume laser measuring device to determine the volume of the shelter; using the temperature probe to determine the temperature within the shelter; using the humidity probe to determine the relative humidity within the shelter; and/or other similar shelter identification tasks. Alternatively, the user may encounter weather conditions while in the game-based environment(s) such as rain, snow, severe weather, and/or the like. A message 190 relates to the user that equipment used within the environment(s) may be damaged by the weather condition. The user is provided the option of seeking shelter for the equipment as illustrated by 191. If the user decides to seek shelter for the equipment, the user may begin Scenario III—Shelter 188.

After completing Scenario II—Water ID 186, the user may be asked to select at least one water source for further analysis, as illustrated by 192. Once at least one water source is selected for further analysis, the user is directed towards Scenario IV—Water Quality 193. In Scenario IV—Water Quality 193, the user may be request to perform water quality tasks such as recording of physical observations of at least one body of water; conducting further testing on at least one body of water and determining at least one body of water suitable for drinking and sanitation; interpreting results of testing and identifying a single source of water for future settlement; communicating technical information using informal and/or formal dialogue; and/or other similar water quality tasks.

If the user selects to interact with food, the user may be directed to Scenario V: ID Food 194. In Scenario V: ID Food 194, the user may be requested to perform food identification tasks such as identifying adequate sources of nutrition; recording of physical observations of at least one food source; conducting further testing on at least one food source and determining at least one food source suitable for digestion; interpreting results of testing and identifying a single source of food for future settlement; communicating technical information using informal and/or formal dialogue; and/or other similar food identification tasks.

If the user experiences illness 182, the user may be directed to Scenario VI: Health 195. In Scenario VI: Health 195, the user may be requested to perform health tasks such as conducting an examination to determine the cause of illness; interpreting data regarding blood, blood pressure, oxygen/carbon dioxide, caloric content, temperature, and/or other similar characteristics; diagnosing the ailment associated with the illness; prescribing remedies to cure the ailment and/or illness; and/or other similar health tasks.

As illustrated by 196, once the user has identified water 176, shelter 178, and food 180 and completed Scenarios 186, 188, and 194, the user may be directed to Scenario VII: Site Selection 197. In Scenario VII: Site Selection 197, the user may be requested to perform site selection tasks such as providing a report detailing each of the identified water 176, shelter 178, and/or food 180 sources within the environment(s); communicating the best site for settlement within the environment(s); and/or other similar site selection tasks. Once it is determined the user has selected an optimal site for settlement within the environment(s), the game may restart and/or end 198.

4. Development of Exemplary Scenarios and Tasks within the Client Application

The electronic game-based learning system 10 teaches concepts and skills based on national learning standards, state learning standards, and/or the like. These concepts and skills are provided in a real-world context giving users experience in solving authentic problems. By providing the input of content experts, practitioners, and instructors, exemplary scenarios and tasks within the client application may be developed. FIG. 8 illustrates an exemplary flowchart of one method of developing scenarios and tasks.

Initially, as illustrated by 200, a team of subject matter experts, practitioners, and instructional designers is formed. The subject matter experts may be versed in content such as, but not limited to, language arts, reading and literature, math, algebra, science, physical science, social studies, and/or other relevant content for inclusion within the client application 14. Additionally, the team includes at least one practitioner in the field of pedagogy and at least one instructional designer.

The team of subject matter experts provide game design principles in the development of a scenario as illustrated by 210. The game design principles include the use of learning strategies and concepts and skills based on national learning standards, state learning standards, and/or the like.

Once the game scenario has been developed, the game scenario is tested and evaluated within a formative game evaluation document as illustrated by 204. The formative game evaluation document includes the state standards identified in the scenario, the game principles associated with the learning activities, and areas to track user feedback. It allows evaluators to ensure the game is meeting specified standards/principles.

The formative game evaluation document may be reviewed by at least one game developer for technical requirements. Additionally, the formative game evaluation document is reviewed by a pilot group of user, e.g. students. For example, the formative game evaluation document may be reviewed by a group of one to five students to test learning capability, ease of use, and/or other similar factors.

The formative game evaluation document is further reviewed to confirm that the game principles and learning standards are provided within the game scenario. For example, the formative game evaluation document may be provided to a committee of one or more practioners, subject matter experts, instructional designers, and/or the like to review the game scenario. A base level of minimum specifications may be instituted upon which to compare the game scenario.

If the formative game evaluation document is determined to not meet the minimum specifications, feedback may be provided to subject matter experts, pedagogy practitioners, and/or instructional designers to redesign the game scenario to compile with minimum specifications as illustrated by 206.

If the formative game evaluation document is determined to meet the minimum specifications, the game scenario is provided to develop via a product backlog as illustrated by 208. The product backlog is generally the master list of functionality desired within the product. The product backlog may be added to and/or detract from as the needs of the product and/or users change.

The game scenario is then developed, documented, tested, implemented, and/or delivered into a game-based learning environment(s) as illustrated by 210. The game scenario is subjected to pilot and/or field-testing as illustrated by 212. For example, the game scenario may be subjected to field-testing using one or more students.

If the pilot and/or field-test of the game scenario within the game-based learning environment(s) is considered to meet minimum specifications, it may be considered complete and permanently placed within the game-based learning environment(s) as illustrated by 214. If the pilot and/or field-test of the game scenario within the game-based learning environment(s) does not meet minimum specifications, feedback may be provided to subject matter experts, pedagogy practitioners, and/or instructional designers for redesign of the game scenario as illustrated by 216.

From the above description, it is clear that the present invention is adapted to carry out the objects and to attain the advantages described herein, as well as those inherent in the invention. Although the foregoing invention has been described in some detail by way of illustration and example, it will be apparent to those skilled in the art that modifications may be practiced without departing from the spirit and scope of the present invention, as described herein. Thus, the present invention is not intended to be limited to the embodiments shown, but is to be accorded the widest scope consistent with the principles and features described herein.

What is claimed is:

1. An electronic game-based learning system providing a game-based learning environment(s) to a plurality of users, comprising:
   at least one client system receiving and executing one or more client applications;
   at least one host system providing at least a portion of the client applications to the client system, the host system comprising:
      at least one game server providing the client applications, wherein at least one of the client applications is an associated client application;
      a game server manager identifying the associated client application and interfacing the client system with the associated client application;
   wherein the associated client application provides game-based learning environments(s) to the client system, the game-based environment(s) having process skills based on learning standards;
   wherein the game-based learning environment(s) provide interaction with at least one user in a virtual environment while teaching the process skills based on the learning standards; and
   wherein the process skills include reasoning, problem-solving, and critical-thinking skills.

2. The electronic game-based learning system of claim 1, further comprising a master game server capable of authenticating and interfacing the client system with the game server.

3. The electronic game-based learning system of claim 1, wherein the client system stores and provides at least a portion of the associated client application.

4. The electronic game-based learning system of claim 3, further comprising a versioning server updating at least a portion of the associated client application stored on the client system.

5. The electronic game-based learning system of claim 1 further comprising a database server storing data provided by the execution of the associated client application.

6. The electronic game-based learning system of claim 1, wherein the associated client application comprises:
   at least one in-game application tool executable by the client system.

7. The electronic game-based learning system of claim 1 wherein the in-game application tool is a spreadsheet.

8. The electronic game-based learning system of claim 1, further comprising an administrator system, the administrator system evaluating execution of the associated client application on the client system in real time, the administrator system further allowing an administrator at least one of interacting with the user through the associated client application in real-time and evaluating the user through the associated client application in real-time.

9. A method of providing a client application to at least one client system, the client application providing game-based learning environment(s) having process skills based on learning standards, the method comprising steps of:
   establishing at least a portion of a host system on a network, the host system comprising a master server, at least one game server, and a master game server;
   receiving, by the master server, a valid logon command, and interfacing, through the master server, the client system with the least one game server, the game server having at least two client applications, wherein at least one of the client applications is an associated client application;
   identifying, by the master game server, an associated client application and interfacing the client system with the associated client application; executing at least a portion of the associate client application on the client system to provide the game-based learning environment(s); and
   displaying, by the client system, the game-based learning environment(s), wherein the game-based learning environment(s) provides interaction with at least one user in a virtual environment while teaching the process skills based on learning standards, wherein the process skills include reasoning, problem-solving, and critical-thinking skills.

\* \* \* \* \*